(12) United States Patent  
Curtwright

(10) Patent No.: US 11,554,753 B2  
(45) Date of Patent: Jan. 17, 2023

(54) WINDOW WIPER ASSEMBLY WITH LATERAL MOTION

(71) Applicant: James William Curtwright, Champlin, MN (US)

(72) Inventor: James William Curtwright, Champlin, MN (US)

( * ) Notice: Subject to any disclaimer, the term of this patent is extended or adjusted under 35 U.S.C. 154(b) by 0 days.

(21) Appl. No.: 17/686,329

(22) Filed: Mar. 3, 2022

(65) Prior Publication Data

US 2022/0388483 A1 Dec. 8, 2022

Related U.S. Application Data

(60) Provisional application No. 63/196,557, filed on Jun. 3, 2021.

(51) Int. Cl.
*B60S 1/34* (2006.01)
*B60S 1/38* (2006.01)
*B60S 1/36* (2006.01)
*B60S 1/44* (2006.01)
*B60S 1/40* (2006.01)
*B60S 1/08* (2006.01)
*B60S 1/04* (2006.01)

(52) U.S. Cl.
CPC ........... *B60S 1/3404* (2013.01); *B60S 1/3409* (2013.01); *B60S 1/3497* (2013.01); *B60S 1/36* (2013.01); *B60S 1/365* (2013.01); *B60S 1/40* (2013.01); *B60S 1/44* (2013.01); *B60S 1/0491* (2013.01); *B60S 1/08* (2013.01); *B60S 1/34* (2013.01); *B60S 1/3801* (2013.01)

(58) Field of Classification Search
CPC ........ B60S 1/3404; B60S 1/3409; B60S 1/34; B60S 1/3497; B60S 1/36; B60S 1/365; B60S 1/40; B60S 1/44

USPC ........................... 15/250.23, 250.29, 250.24
See application file for complete search history.

(56) References Cited

U.S. PATENT DOCUMENTS

| | | | | |
|---|---|---|---|---|
| 1,409,055 | A | * | 3/1922 | Meyer ................... B60S 1/3404 15/245 |
| 2,786,225 | A | * | 3/1957 | Stites ..................... B60S 1/3404 15/250.32 |
| 2,829,394 | A | * | 4/1958 | Brigmon ................. B60S 1/365 15/250.41 |

FOREIGN PATENT DOCUMENTS

FR 2704498 * 11/1994

* cited by examiner

*Primary Examiner* — Gary K. Graham  
(74) *Attorney, Agent, or Firm* — Michael A. Mochinski

(57) ABSTRACT

A window wiper assembly for cleaning a surface of a vehicle window, which includes a guide rail mountable to a frame member supporting the window, a wiper arm having an elongate body configured with an opening and integrally connecting to a head portion for mounting thereto wheel assemblies capable of traversing interiorly within the guide rail, a glide post having a wheeled portion for slidably interacting with an integrated rail associated with the opening, a wiper blade assembly mounted to a bottom side of the elongate body, and a pivot arm equipped with first and second mount fittings respectively connecting to a shaft of the glide post and an output shaft of a wiper drive motor, whereby rotation of the output shaft aptly acts on the pivot arm to advance lateral movement of the wiper arm along the guide rail with that of the wiper blade assembly to effect entire surface cleaning of the window.

28 Claims, 19 Drawing Sheets

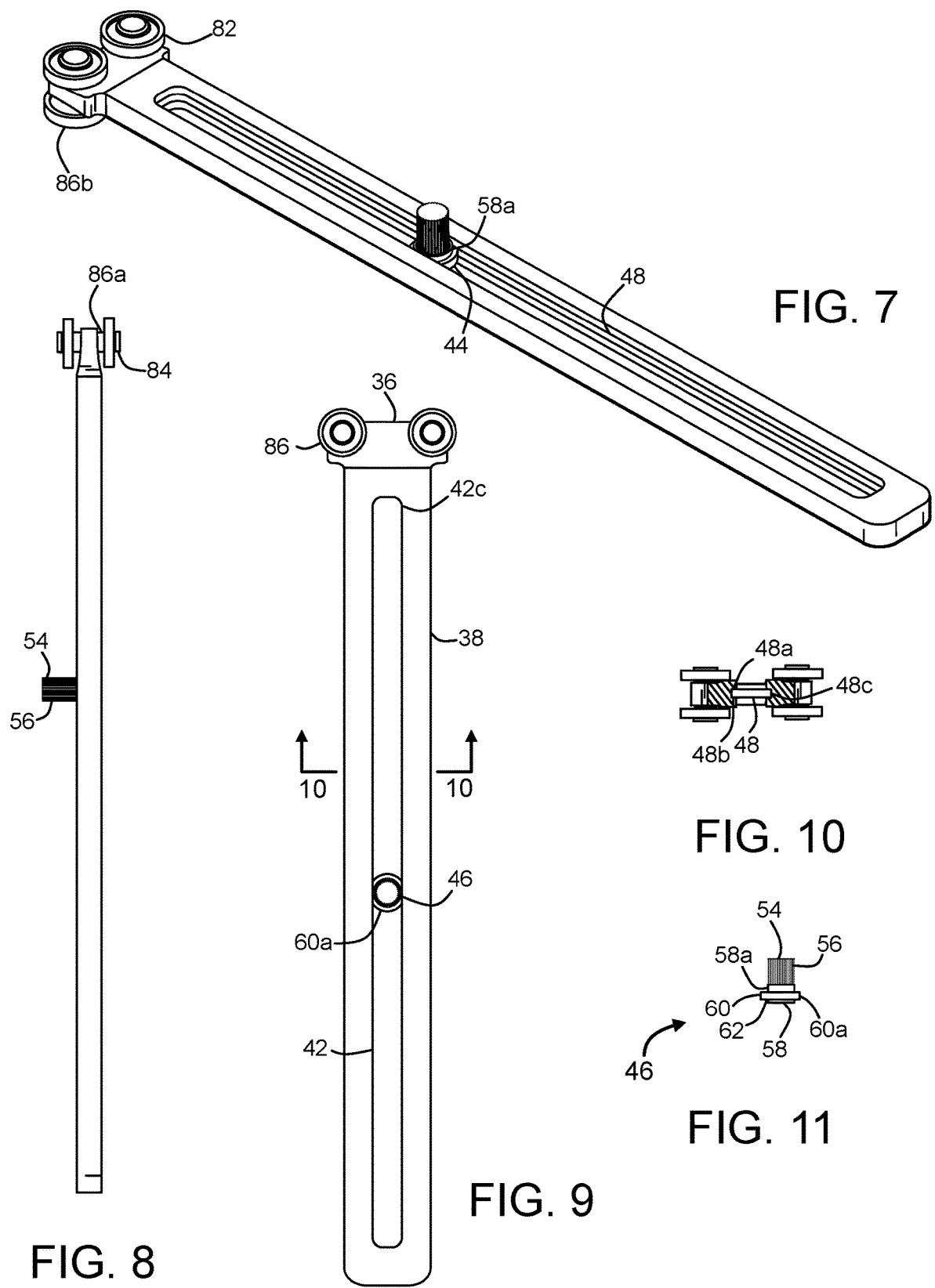

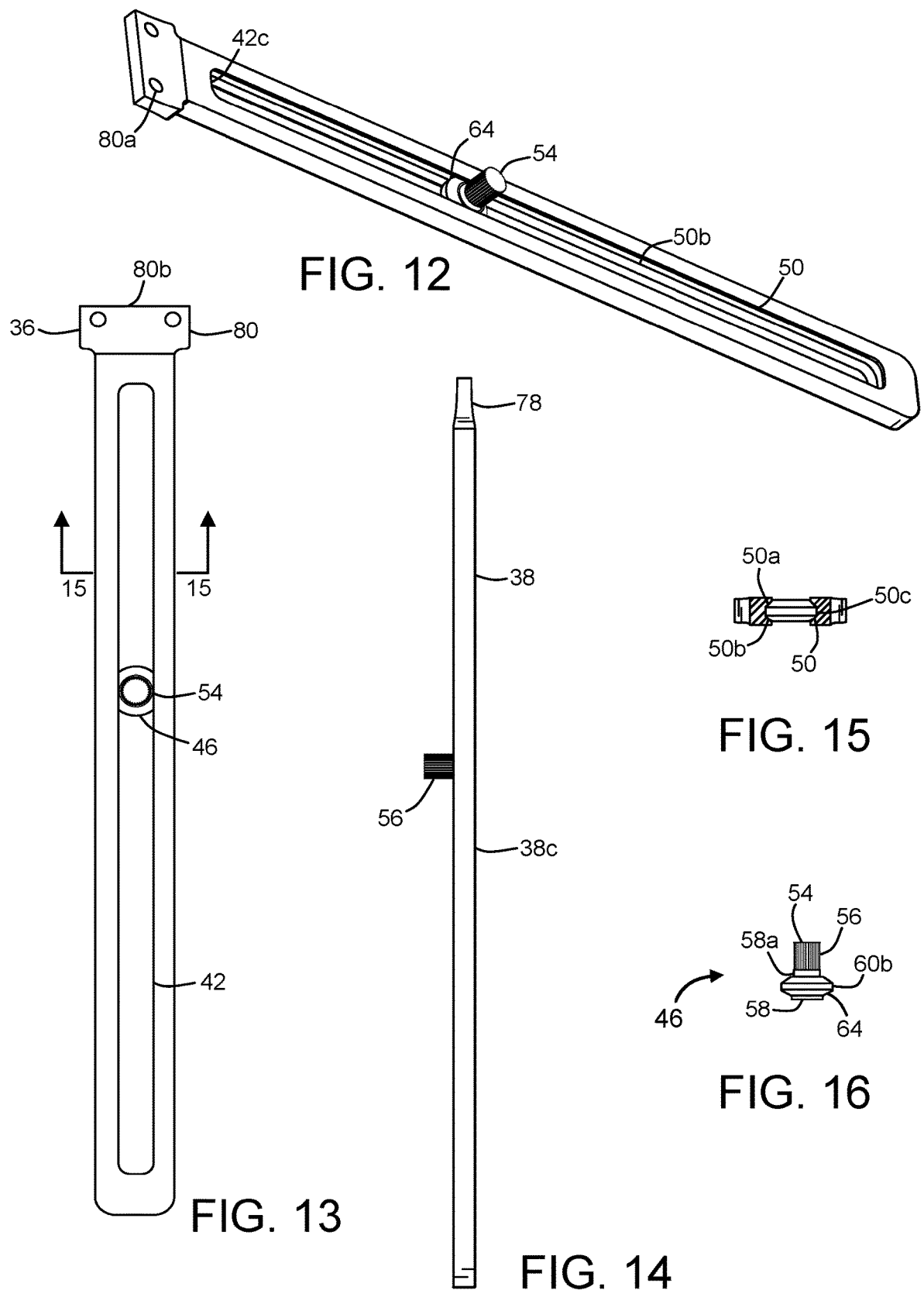

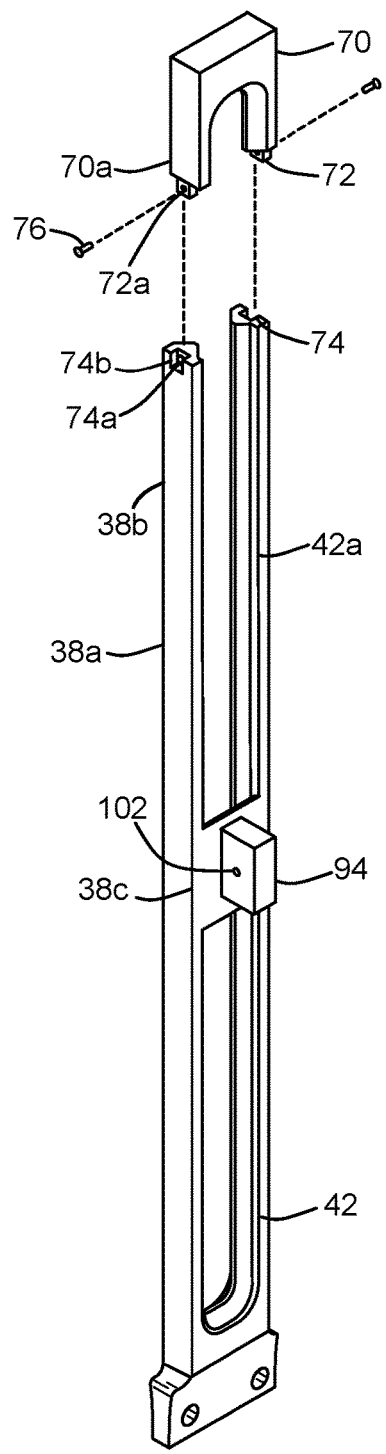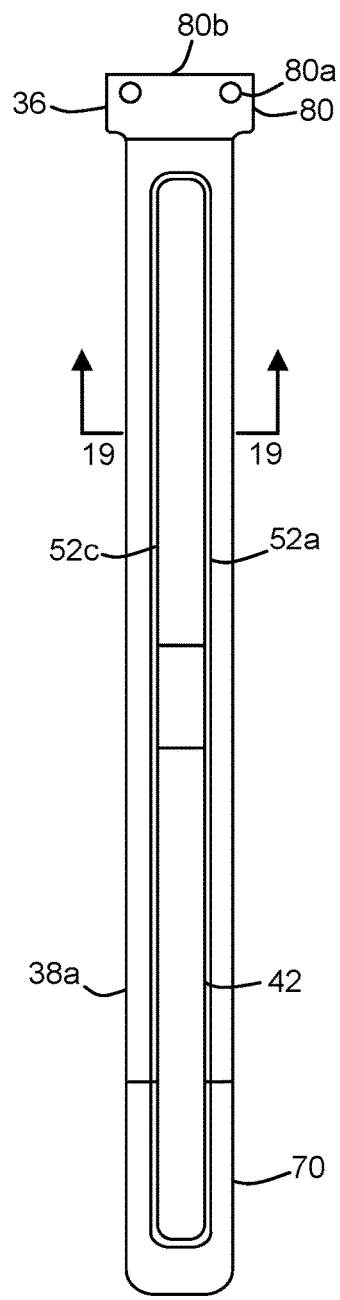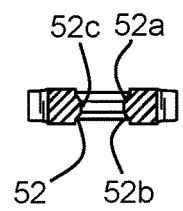
FIG. 19
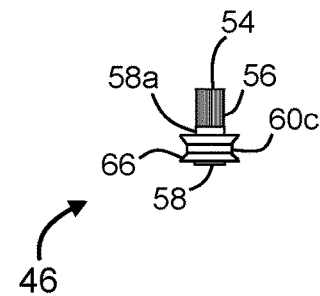
FIG. 20
FIG. 17
FIG. 18

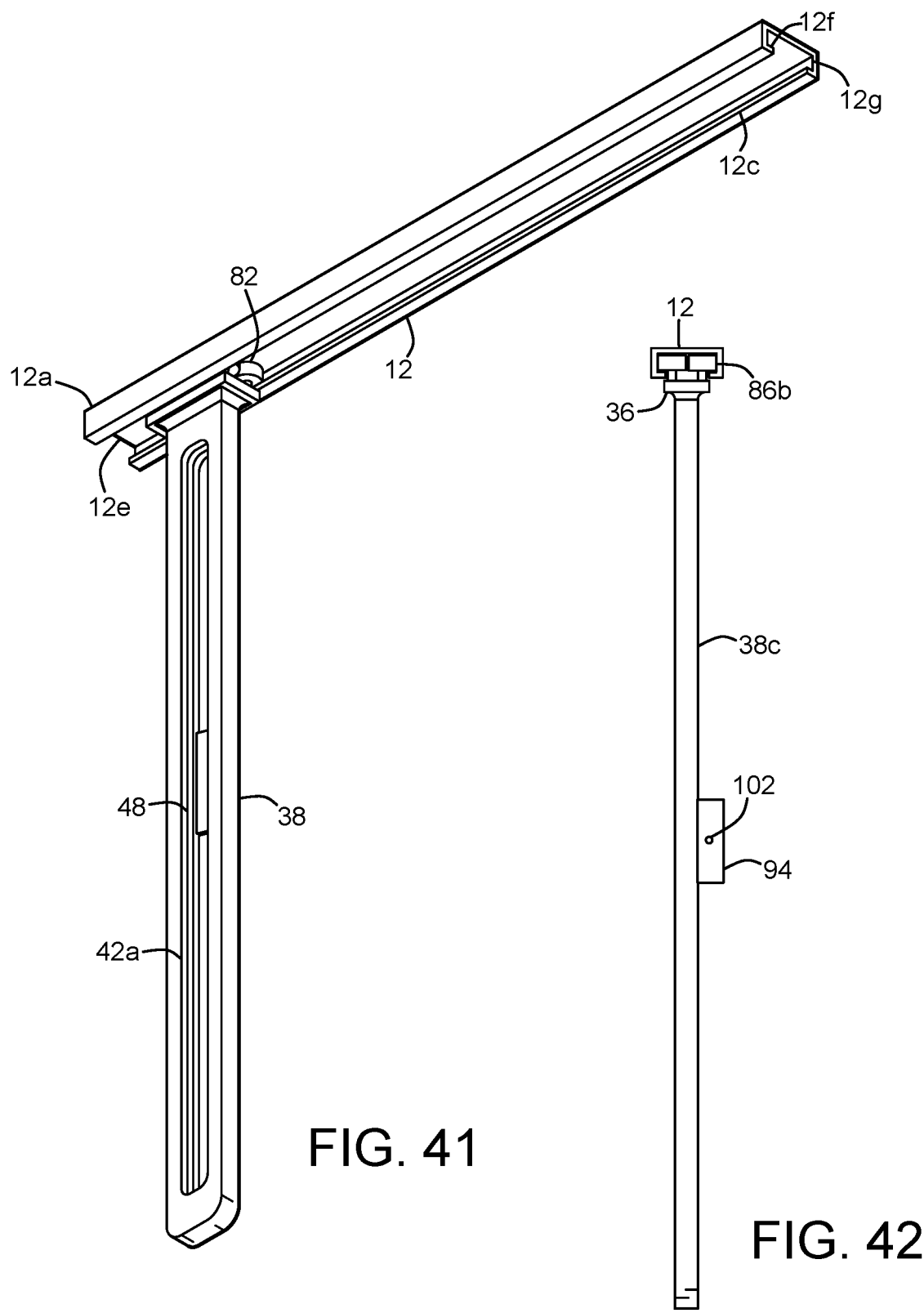

WINDOW WIPER ASSEMBLY WITH LATERAL MOTION

CROSS-REFERENCE TO RELATED APPLICATIONS

This application claims the benefit of U.S. Provisional Application No. 63/196,557, filed on Jun. 3, 2021, entitled "Window Wiper Assembly with Lateral Motion," the disclosures of which, including all attached documents, are incorporated herein by reference in their entirety for all purposes.

FIELD OF THE INVENTION

The present invention is generally directed to a window wiper assembly for fulfilling expanded cleaning of vehicular windows. More particularly, the wiper assembly operates laterally from side to side to fulfill entire surficial cleaning of window glass generally associated, for example, with an automobile, sports utility vehicle (SUV), recreational vehicle (RV), heavy equipment, tractors, and like vehicles, particularly in such manner to establish full and unobstructed viewing through the window that consequentially advances safe operation of the vehicle.

BACKGROUND OF THE INVENTION

Motor vehicles, such as automobiles and heavy equipment, for example, typically accommodate an operator and one or more passengers in a passenger compartment that is commonly equipped with multiple windows to advance safe operation of the vehicle while protecting the occupants from the outside elements or climatic conditions. Most vehicle passenger compartments will incorporate within each of their structures a front windshield and rearward and sideward windows to primarily establish an opportunity to view outwardly 360 degrees around the vehicle. Because of the necessity to view outside the front windshield at all times for safe operation of the vehicle, even under the harshest of conditions, the vehicle ubiquitously employs use of a front window wiper assembly generally incorporated into a vehicle's cowling. In some instances, a separate, secondary wiper assembly positioned at the rearward window, as in the case of a SUV, for example, may be associated with the vehicle to establish enhanced rearward visibility. Commonly, the wiper assembly associated with most vehicles will include a wiper drive motor having an output shaft possessing capabilities to pivotally operate at least one wiper, generally being applicably suited for a front windshield associated with heavy equipment or a rearward window of a SUV, and possibly a second wiper conventionally linked to the output shaft with that of the first wiper to synchronically operate together to fulfill extended cleaning of the window, such as a front windshield of an automobile, albeit to a limited degree.

Despite the usefulness of the modern-day window wiper assembly commonly associated with most vehicle types, there is an inherent drawback: the inability to effectively clean the entire surface of the window. For example, it is well known and understood within the art that dual-acting wipers effect partial cleaning of the window, one that particularly forms an arc-shaped cleaning pattern. Even more apparent, use of a singular wiper of the type typically associated with the rearward window wiper assembly of most SUV's offers limited cleaning of the window. Although straight-on viewing through the window in each of these applications is permissible to a certain degree, unclean surficial portions of the window can detrimentally interfere with full observation of surrounding areas outside the vehicle, possibly to the extent of contributing to formation of blind spots or distorted viewing that may provide for unsafe operation of the vehicle. Furthermore, in the particular case of operating heavy machinery or equipment generally equipped with a single wiper, the operator may be disadvantaged by the limited viewing existing outwardly beyond the frontal area of the vehicle in order to fulfill operational tasks, such as moving or plowing soil, and/or avoiding obstacles and the like that may be encountered in the field from time to time.

In addressing this oddity, most, if not all, vehicle operators will resort to usage of a hand-held squeegee or like device with application of washing fluid or equivalent to effect cleaning of the window in its entirety, which on some occasions may not necessarily be all at that inviting due to adverse climatic conditions outside the vehicle, issues of accessibility or inability to fulfill extended reach relatively about the span of the window.

Accordingly, there remains a need for a window wiper assembly that adaptively connects to and conjunctively operates with a variety of vehicle types and offers expanded, automated cleaning of the window in its entirety to advance safe operation of the vehicle without having to resort to manual cleaning of the window that may arise to a relative degree of inconvenience and difficulty.

BRIEF SUMMARY OF THE INVENTION

In order to overcome the numerous drawbacks apparent in the prior art, a window wiper assembly has been devised for readily attaching to and conjunctively operating with a variety of vehicle types that generally incorporate as part of its operative features a wiper motor assembly.

It is an object of the present invention to provide a window wiper assembly that advances cleaning of the window in its entirety to effectively eliminate blind spots and distorted viewing that may be otherwise present with usage of a modern-day window wiper assembly that typically forms an arc-shaped cleaning pattern.

It is a further object of the present invention to provide a window wiper assembly that facilitates use of conventional wiper blades of the type generally made available and offered in the art for use with modern-day vehicles.

It is yet another object of the present invention to provide a window wiper assembly that is relatively simple in terms of design and construction and can be readily incorporated for use with most vehicle types without deleteriously impacting their inherent structural features, including SUVs', heavy equipment, tractors, and the like.

It is yet another object of the present invention to provide a window wiper assembly that consists of modular components for readily effecting repair and replacement of damaged or failed components.

It is a further object of the present invention to provide a window wiper assembly that offers a variety of design characteristics to coincide with most vehicle styles.

In accordance with the present invention a window wiper assembly has been devised to effect entire surface cleaning of a window, such as those commonly associated with a vehicle, the window wiper assembly principally comprising a guide rail mountable to a frame member supporting the window, generally by end caps or a spoiler; a wiper arm having an elongate body integrally connecting and transitioning to a head portion and being configured with an opening for accepting a glide post for travel relatively therewithin; one or more wheel assemblies mountable to the head portion of the elongate body and housed within an interior chamber of the guide rail for traversing therewithin; a wiper blade assembly mountable to a bottom side of the elongate body and incorporating a wiper blade capable of acting upon the window's surface; and a pivot arm having a wiper arm end and a drive end respectively connecting to first and second mount fittings, each of the mount fittings having an opposing end configured with a bore respectively suited to slidably accept therein a shaft of the glide post and an output shaft of a wiper drive motor of the type typically associated with the vehicle, whereby the forward and reverse rotational movement of the output shaft aptly acts on the pivot arm to advance lateral movement of the wiper arm with that of the connected wiper blade assembly to effect entire surface cleaning of the window.

Other objects, features, and advantages of the present invention will become apparent in the following detailed description of the preferred embodiments thereof when read in conjunction with the accompanying drawings in which like reference numerals depict the same parts in the various views.

BRIEF DESCRIPTION OF THE SEVERAL VIEWS OF THE DRAWINGS

A preferred embodiment of the present invention will now be described by way of example with reference to the accompanying drawings, in which:

FIG. 7 is a top perspective view of the preferred embodiment of the present invention illustrating an elongate body of a wiper arm configured with an opening and a tapered neck transitioning to a widen section equipped with wheel assemblies;

FIG. 8 is a right-side view of the preferred embodiment of the present invention illustrating an elongate body of a wiper arm and a glide post;

FIG. 9 is a top plan view of the preferred embodiment of the present invention illustrating an elongate body of a wiper arm configured with an opening for receiving therewithin a glide post and a tapered neck transitioning to a widen section equipped with wheel assemblies;

FIG. 10 is a cross sectional view of the preferred embodiment of the present invention taken along lines 10-10 in FIG. 9 illustrating an opening with a rectangular inward slot formed by upper, lower and inner walls;

FIG. 11 is a front side view of the preferred embodiment of the present invention illustrating a glide post having a shaft with splines and a mount end fitted with a flat ring bearing;

FIG. 12 is a top perspective view of the preferred embodiment of the present invention illustrating a wiper arm having an elongate body configured with an opening and fitted with a glide post;

FIG. 13 is a top plan view of the preferred embodiment of the present invention illustrating an elongate body of a wiper arm configured with an opening and fitted with a glide post;

FIG. 14 is a right-side view of the preferred embodiment of the present invention illustrating an elongate body of a wiper arm configured with a tapered neck and fitted with a glide post;

FIG. 15 is a cross sectional view of the preferred embodiment of the present invention taken along lines 15-15 in FIG. 13 illustrating an opening with an angular inward slot formed by upper, lower and inward walls;

FIG. 16 is a front side view of the preferred embodiment of the present invention illustrating a glide post having a shaft with an adaptive end with splines and a mount end fitted with an exterior beveled ring bearing;

FIG. 17 is a bottom perspective view of the preferred embodiment of the present invention illustrating an elongate body of a wiper arm having a detachable section and a mount block attached to a bottom side thereof;

FIG. 18 is a top perspective view of the preferred embodiment of the present invention illustrating an elongate body of a wiper arm having a detachable section connecting to a remaining portion of the elongate body;

FIG. 19 is a cross sectional view of the preferred embodiment of the present invention taken along lines 19-19 in FIG. 18 illustrating an opening with an angular outward member formed by upper, lower and outward walls;

FIG. 20 is a front side view of the preferred embodiment of the present invention illustrating a glide post having an adaptive end with splines and a mount end fitted with an interior beveled ring bearing;

FIG. 41 is a top perspective view of the preferred embodiment of the present invention illustrating a wiper arm having wheel assemblies mounted to an alternative configuration of a head portion and housed within an interior chamber of a guide rail;

FIG. 42 is a right-side view of the preferred embodiment of the present invention illustrating a wiper arm having wheel assemblies housed within an interior chamber of a guide rail;

DETAILED DESCRIPTION OF THE INVENTION

While this invention is susceptible of being embodied in many different forms, the preferred embodiment of the invention is illustrated in the accompanying drawings and described in detail hereinafter with the understanding that the present disclosure purposefully exemplifies the principles of the present invention and is not intended to unduly limit the invention to the embodiments illustrated and presented herein. The present invention has particular utility as a window wiper assembly that readily adapts to and operates conjunctively with existing wiper motor assemblies commonly associated with modern-day vehicles to effect cleaning of the entire surficial area of a window, such as a front windshield of a vehicle or a rearward window of a sport utility vehicle (SUV), for example.

Figure 1:
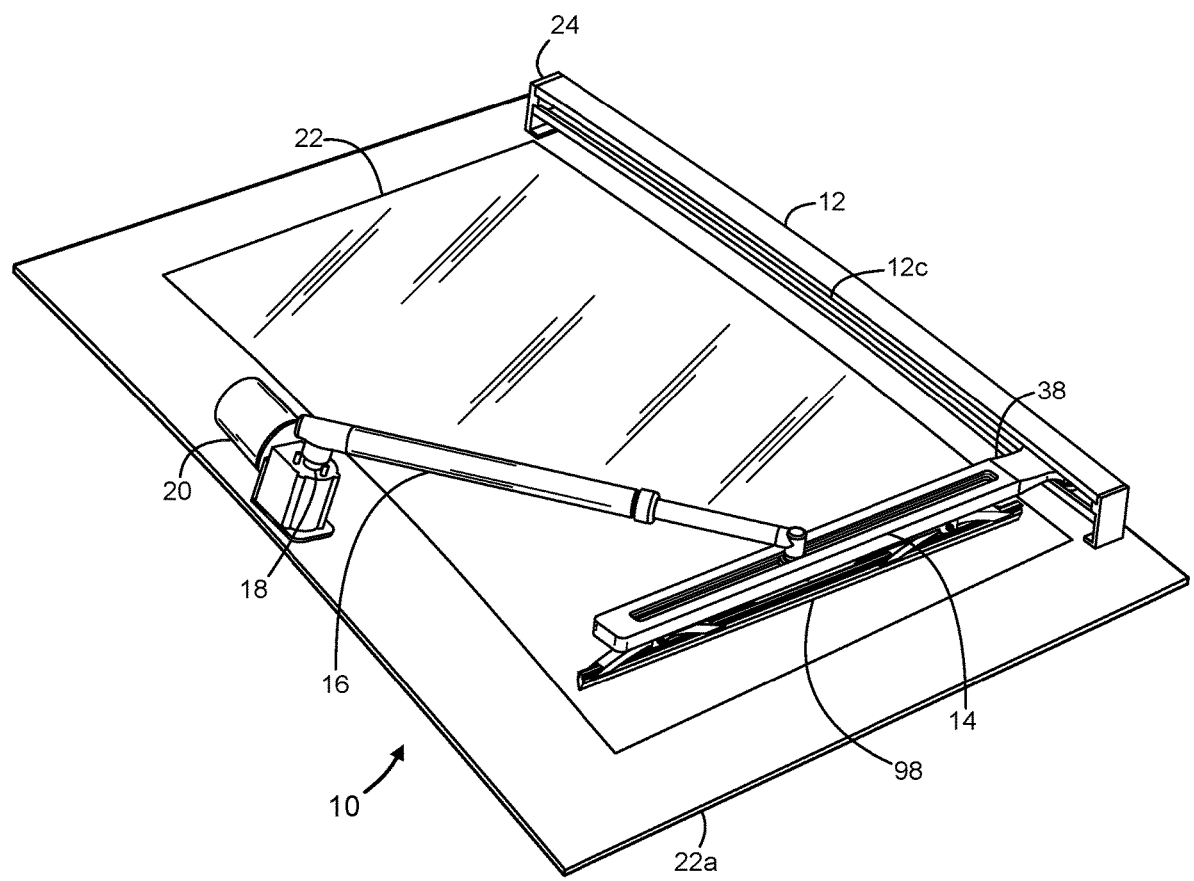
FIG. 1 is a top perspective view of the preferred embodiment of the present invention illustrating a guide rail mounted to a frame member supporting a window and a pivot arm connecting to a wiper drive motor and a wiper arm.
Figure 2:
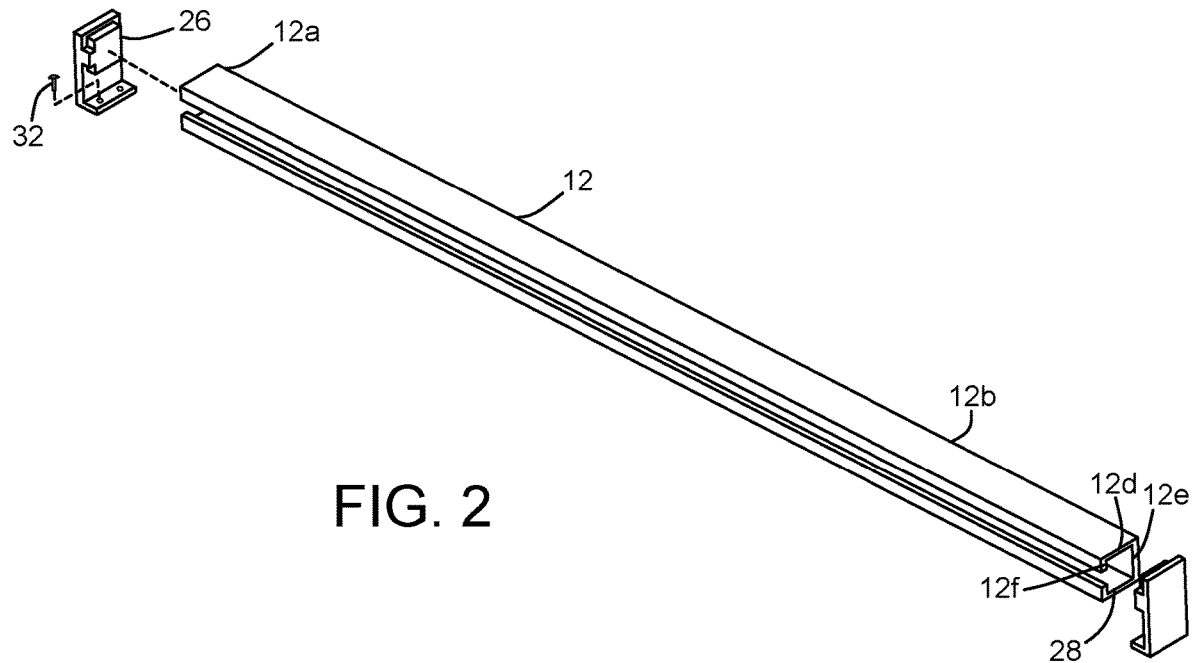
FIG. 2 is a top perspective view of the preferred embodiment of the present invention illustrating a guide rail and a pair of end caps in an unmounted position.
Figure 3:
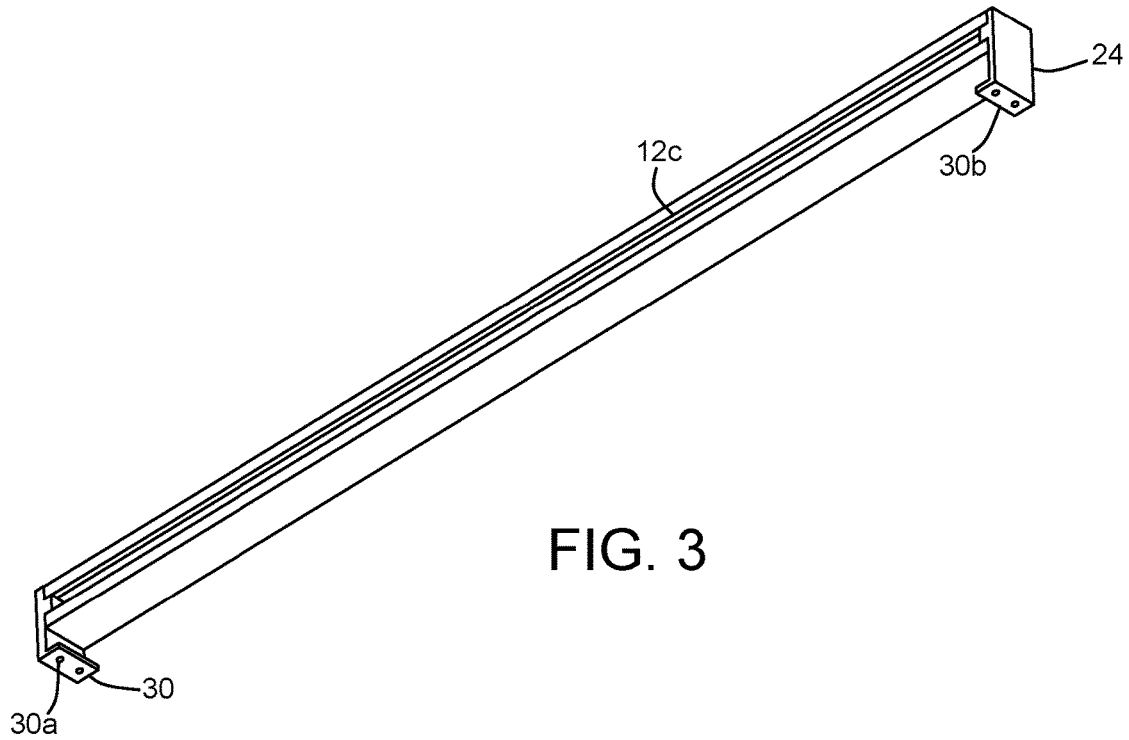
FIG. 3 is a bottom perspective view of the preferred embodiment of the present invention illustrating a guide rail having ends each being fitted with an end cap.

Referring now to FIG. 1, there is shown generally at 10 a window wiper assembly comprising a guide rail 12 for guiding and carrying a wiper arm 14 relatively about the length of the guide rail generally in a perpendicular manner thereto and a pivot arm 16 connecting the wiper arm to an output shaft 18 of a wiper drive motor 20 for operably effecting lateral motion of the wiper arm, the wiper drive motor being of the type commonly available and associated with most modern-day vehicles. The guide rail, generally formed as an extrusion, is shown to comprise a length substantially equivalent to the span or dimensional width of a window 22 commonly associated with the vehicle, such as a front windshield of a tractor or a rearward window of a SUV, for example. As indicated in FIG. 1, the guide rail is mounted to a frame member 22a structurally supporting the window by mounting means, preferably in the form of a pair of end caps 24 mounted a predetermined distance above the window. Each end cap is shown in FIG. 2 to include an outwardly extending insert 26 having an overall geometric configuration substantially coinciding with an internal cross-sectional profile 28 of the guide rail so as to slidably and tightly fit within each end 12a of the guide rail, particularly allowing exterior sides of the end cap 24a to exist relatively flush with outer sidewalls 12b of the guide rail, as generally depicted in FIG. 3. Mounting of each of the end caps 24 to the vehicle may be advanced by a mount flange 30 orientated inwardly below the guide rail and having apertures 30a for accepting therethrough an equal number of mount screws 32. Alternatively, adhesive or double-face tape applied to a bottom side 30b of the mount flange may be appropriately used in lieu of screws to serve as a less intrusive mounting option.

Figure 4:
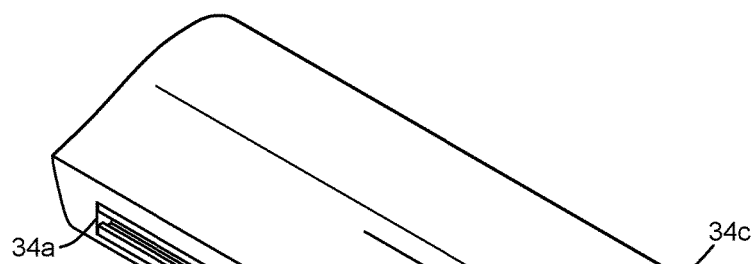
FIG. 4 is a bottom perspective view of the preferred embodiment of the present invention illustrating a spoiler having an elongate socket for housing and retaining a guide rail.
Figure 5:
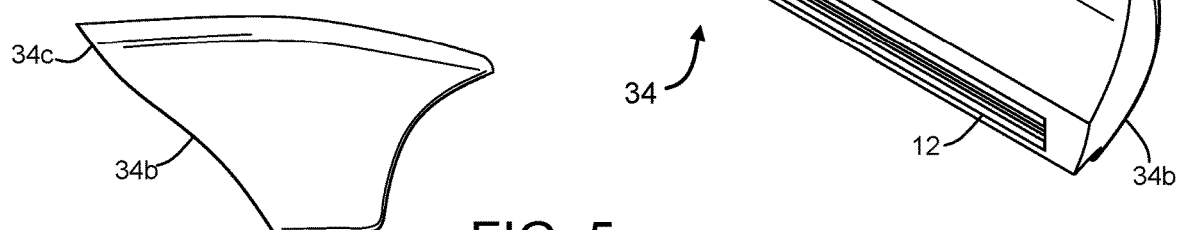
FIG. 5 is a right-side view of the preferred embodiment of the present invention illustrating a spoiler having a stylistic conforming end and a converging overhang.
Figure 6:
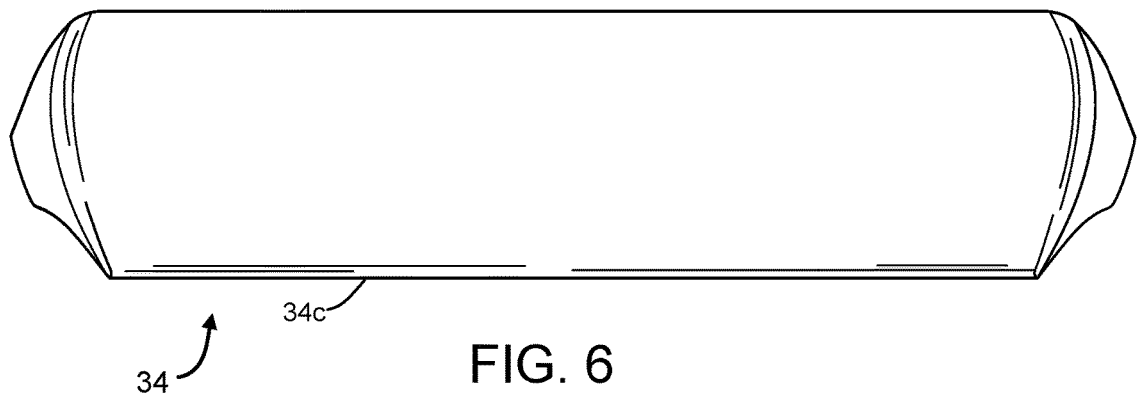
FIG. 6 is a top plan view of the preferred embodiment of the present invention illustrating a spoiler having a pair of stylistic conforming ends.

In an alternative form of mounting means, as generally depicted in FIG. 4, the guide rail 12 may be held in place and encased within an elongate socket 34a of a spoiler 34, whereby the overall geometric shape of the spoiler may stylistically conform to or coincide with the outward body style of the vehicle to yield streamline appearance, such in the instance of utilizing the window wiper assembly 10 in connection with a rearward window of a SUV, for example. Like the end caps 24, mounting of the spoiler to the vehicle may involve application of adhesive or double-side tape or other conventional forms of fasteners particularly suited to offer secure support of the spoiler and accompanying guide rail 12 during operative conditions. Other design aspects of the spoiler, as shown in FIGS. 5 and 6, may include stylistic conforming ends 34b and a converging overhang 34c that extends outwardly from the vehicle, beyond the elongate socket 34a, to further protect the guide rail from the elements and limit intrusion of debris and like matter into an elongate opening 12c structurally associated with the guide rail.

Now in reference to FIGS. 7-9, the wiper arm 14 is shown therein to comprise a head portion 36 integrally connecting to an elongate body 38 for supporting a wiper blade assembly 40 that purposely interacts with the surficial area of the window 22 to effect cleaning thereof in its entirety. An opening 42 extending through the elongate body, relatively about its the length, is illustrated in FIG. 7 to include a perimeter wall 42a configured in part as an integrated rail 42b for interactively engaging with a wheeled portion 44 of a glide post 46. As generally depicted in FIGS. 7-20, the integrated rail may comprise varying cross-sectional profiles to effect a secure relationship with an equally configured wheeled portion while it glidingly traverses relatively about the length of the opening 42 during operation.

In a first form of the integrated rail, as shown in FIGS. 7-11, the integrated rail may incorporate within its profiled structure a rectangular inward slot 48 having upper and lower walls 48a, 48b substantially existing parallel with one another and terminating at an inner wall 48c, whereby the wheeled portion 44 geometrically conforms to the rectangular inward slot so as to advance travel along the integrated rail without deleteriously separating from the opening 42. In an alternative, second form of the integrated rail, as shown in FIGS. 12-16, the integrated rail 42b may incorporate within its profiled structure an angular inward slot 50 having upper and lower walls 50a, 50b angularly orientated inward from the perimeter wall 42a a predetermined distance to converge at an inward wall 50c, whereby the wheeled portion 44 geometrically conforms to the angular inward slot so as to equally advance travel along the integrated rail without deleteriously separating from the opening. In a third and final form of the integrated rail, as shown in FIGS. 17-20, the integrated rail 42b may incorporate within its profiled structure an angular outward member 52 having upper and lower walls 52a, 52b angularly orientated outward from the perimeter wall a predetermined distance to converge at an outward wall 52c, whereby the wheeled portion 44 geometrically conforms to the angular outward member so as to equally advance travel along the integrated rail without deleteriously separating from the opening.

It is generally understood within the context of the window wiper assembly 10 that the integrated rail 42b may incorporate within its overall functional design other geometric arrangements and profiles than those provided and discussed above to advance desirable operation in securing the glide post's relationship with the integrated rail while traversing along the opening 42. Accordingly, it is conceivable that the integrated rail, regardless of its geometric profile, will in all instances geometrically coincide with the outward profile of the wheeled portion 44 such to satisfy the requisite amount of hold yet permit free rotation thereof while traversing the length of the opening during operation.

As generally represented in FIGS. 11, 16, and 20, the glide post 46 is of the particular type generally offered and available in the art for the purposes disclosed herein, one that characteristically includes a shaft 54 incorporating an adaptive end 56 with an effective diameter slightly less than the width of the opening and a mount end 58 for accepting and mounting a shaft bearing 60 configured with a predetermined outward profile, of which aptly constitutes the wheeled portion 44 of the glide post. As shown in FIG. 11, a first outward profile 60a of the shaft bearing is primarily formed by a flat ring bearing 62 that adaptively fits within the rectangular inward slot 48, whereas a bare cylindrical portion 58a of the mount end 58, as existing above and below the flat ring bearing and generally having a diameter approximating the width of the opening, slidably engages and rides against a portion of the perimeter wall 42a. Similarly, as shown in FIG. 16, the second outward profile 60b of the shaft bearing 60 is formed by an exterior beveled ring bearing 64 that adaptively fits within the angular inward slot 50, whereas the third outward profile 60c of the shaft bearing, as depicted in FIG. 20, is formed by an interior beveled ring bearing 66 that adaptively mates with the angular outward member 52. As further observed in FIGS. 11 and 16, the adaptive end 56 of the glide post 46 incorporates within its structure varying profiles to correspond and mate with a first mount fitting 68 associated with the pivot arm 16, particularly of which may include splines 68a, notches, keys and other geometric configurations that mainly inhibits unwanted rotation while the pivot arm movably acts on the wiper arm 14 to advance lateral motion thereof.

As further illustrated in FIGS. 17 and 18, the elongate body 38 of the wiper arm is shown therein as comprising a detachable section 70 to accommodate placement of the wheeled portion 44 of the glide post into the opening 42 under certain circumstances of design. It is generally understood that the wheeled portion may be incapable by design or manufacture of being disassembled and re-assembled to accommodate its overall placement within the opening to interactively engage with the integrated rail 42b for the purposes described herein. For example, the flat ring bearing 62 constituting the wheeled portion is inherently incapable of being placed with the rectangular inward slot 48 without some aspect of disassembly. Conversely, the interior beveled ring bearing 66 may be fabricated as two separable components that can be disassembled from the mount end 56 of the shaft 54 with each being placed relatively about the angular outward member 52 of the integrated rail and reassembled onto to the mount end. In accommodating its connection with a remaining portion 38a of the elongate body, a pair of free ends 70a of the detachable section individually includes a prong 72 capable of being placed within an equally configured socket 74 present about a mating end 38b associated with the remaining portion. One or more fasteners 76, such as screws and the like, threadably fitted into cross bores 72a, 74a extending through the prong and into a wall 74b of the equally configured socket fulfills to secure the connection.

Figure 21:
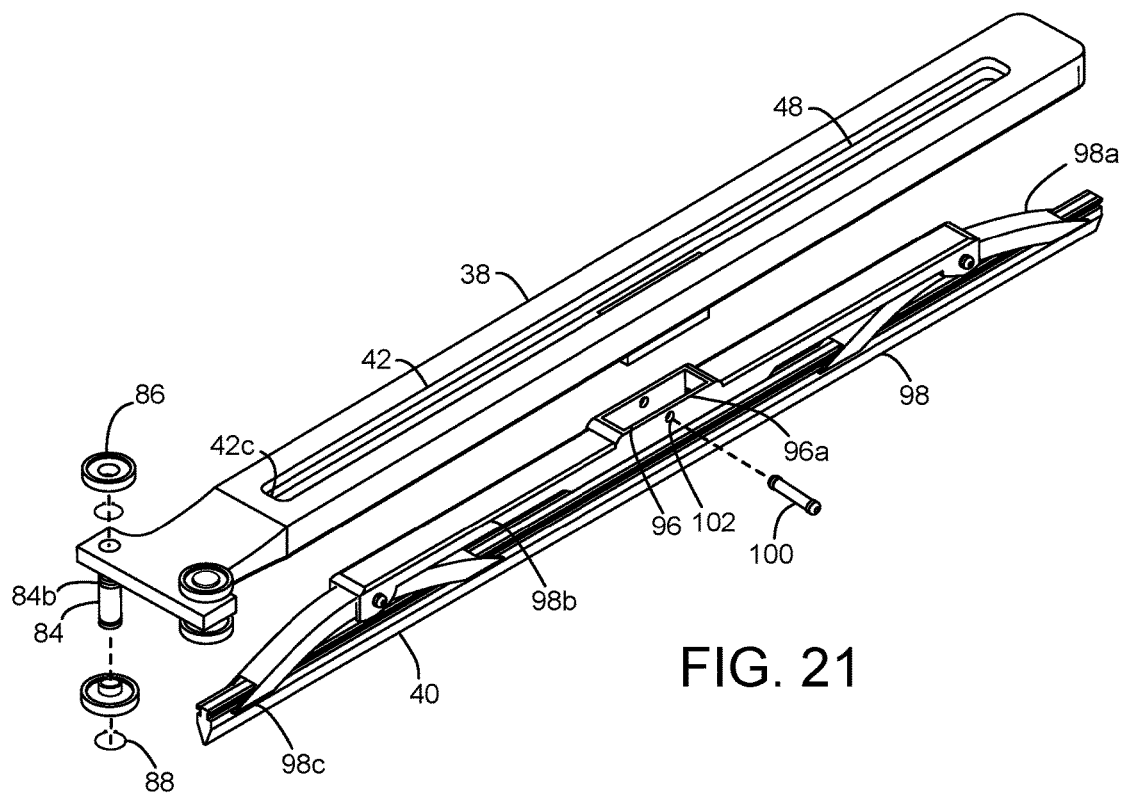
FIG. 21 is a top perspective view of the preferred embodiment of the present invention illustrating an elongate body of a wiper arm proposed to receive a first form of a wiper blade assembly and a pair of wheel assemblies.
Figure 22:
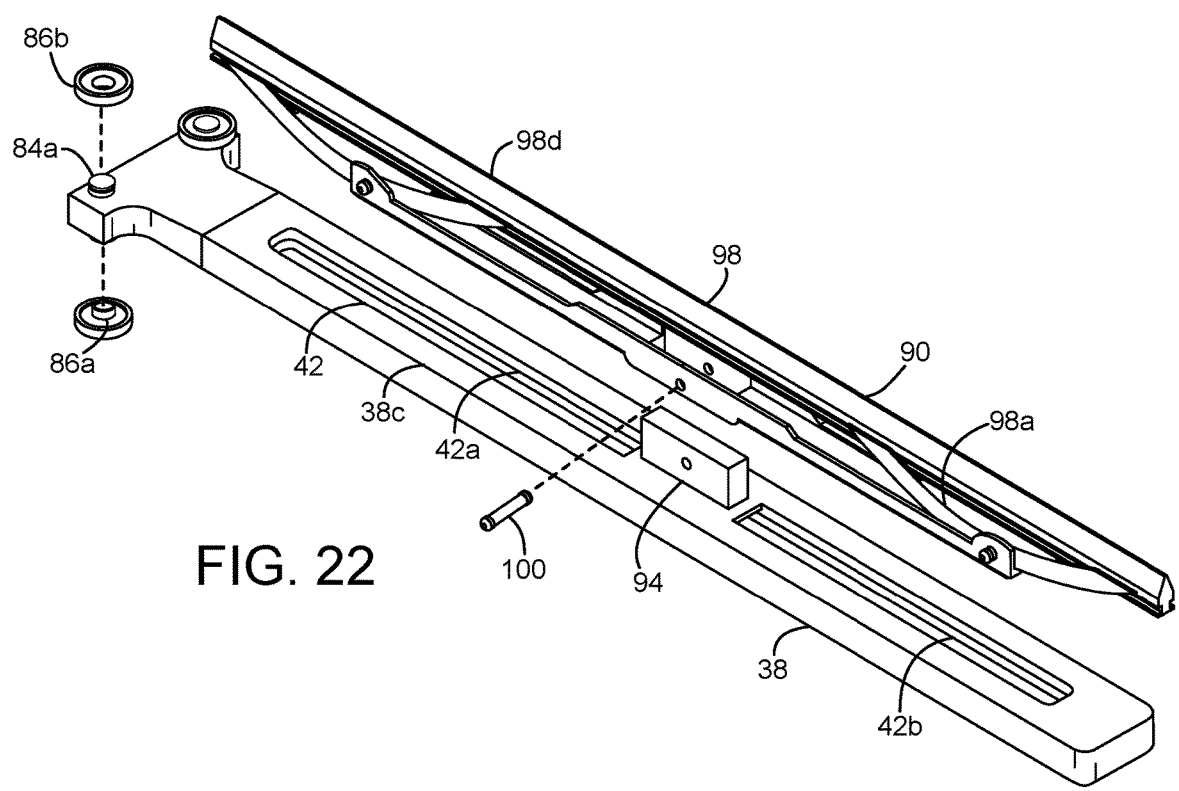
FIG. 22 is a bottom perspective view of the preferred embodiment of the present invention illustrating an elongate body of a wiper arm proposed to receive a first form of a wiper blade assembly and a pair of wheel assemblies.
Figure 23:
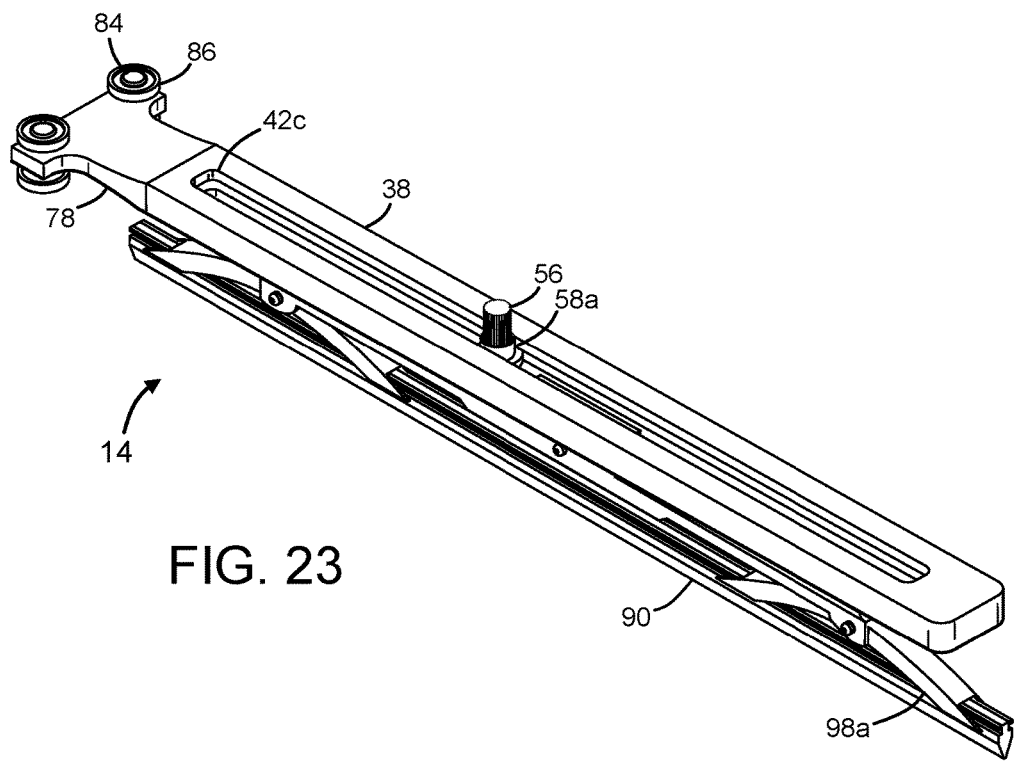
FIG. 23 is a top perspective view of the preferred embodiment of the present invention illustrating a wiper arm assembled with a first form of a wiper blade assembly and a pair of wheel assemblies.

In FIGS. 1 and 7, the head portion 36 of the wiper arm 14 is generally featured with a tapered neck 78 integrally extending from the elongate body 38 to a widened section 80 to substantially form an overall configuration or shape resembling a T that is suitable to pass through the elongate opening 12c for partial placement within an interior chamber 12d of the guide rail 12. A pair of apertures 80a present about and extending through the widened section individually accommodates a wheel assembly 82 that is equally housed within the interior chamber. As generally shown in FIGS. 21-23, each wheel assembly preferably comprises a shaft 84 configured to pass through the aperture with a pair of ends 84a each being adaptably fitted with a wheel 86. Each wheel is further shown to include a raised hub portion 86a that aptly sits against and engages an outer surface 80b of the widened section 80 to elevate the wheel predetermined distance above the head portion to yield free rotational movement. A retaining ring 88 placed into an annular groove 84b present about the shaft's end secures the wheel to the shaft. It is further observed in FIG. 24 that each of the wheels 86 comprises an effective diameter that allows a circumferential surface portion 86b of the wheel to rotationally engage with an upper interior wall 12e of the guide rail 12 simultaneously with that of interior leading edges 12f extending parallel to one another, generally of which defines the construct of the elongate opening 12c. Accordingly, it is desirable that the wheel assemblies connectively associated with the head portion 36 include a dimensional relationship, both in terms of width and depth, to occupy the interior chamber of the guide rail 12 to the extent of mitigating occurrences of racking and other undesirable movements that may deleteriously impact free movement of the wiper arm 14 relatively about the length of the guide rail 12.

Figure 24:
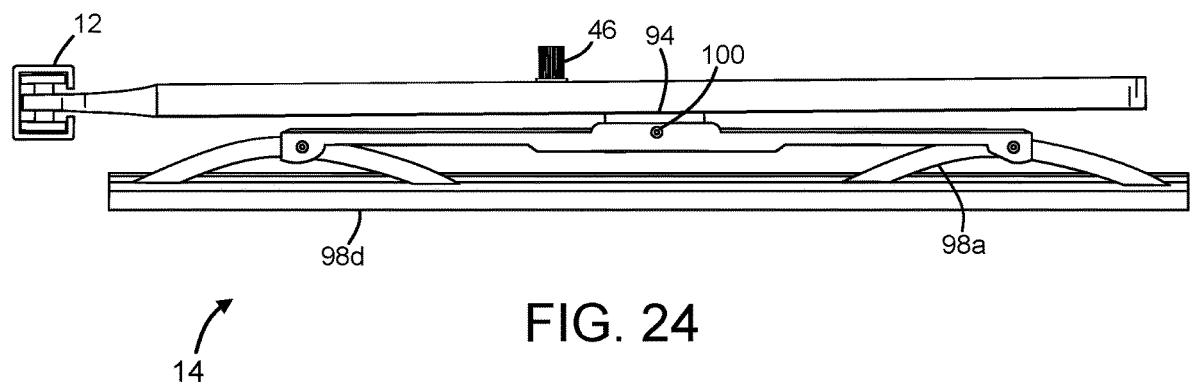
FIG. 24 is a left-side view of the preferred embodiment of the present invention illustrating a wiper arm assembled with a first form of a wiper blade assembly and a pair of wheel assemblies housed within an interior chamber of a guide rail.

In further reference to FIGS. 21-24 and 25-28, the wiper arm is associated with wiper attachment means for attaching to the elongate body first and second forms of a wiper blade assembly 90, 92. Wiper attachment means, as associated with the first form of the wiper blade assembly, comprises a mount block 94 connecting to and extending downwardly from a bottom side 38c of the elongate body 38 to slidably fit within a four-sided opening 96 of a conventional wiper blade 98, primarily as shown in FIGS. 21 and 22 Other features associated with the conventional wiper blade include a pair of arcuate-shaped arms 98a with each being pivotally attached to a body 98b and having ends 98c capable of slidably accepting a flexible wiper blade 98d. The mount block in this regard is depicted in FIGS. 22 and 24 as being secured to the conventional wiper blade by a fastener or lock pin 100 suited to slidably fit within an arrangement of cross bores 102 extending through the mount block 94 and sidewalls 96a of the four-sided opening 96.

Figure 25:
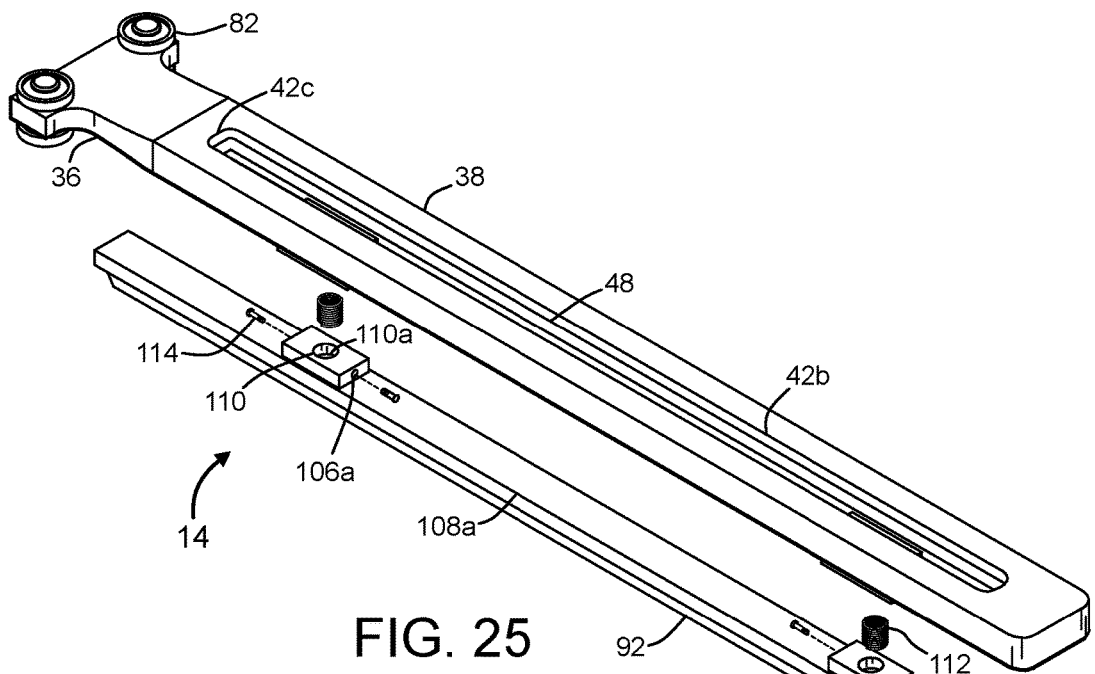
FIG. 25 is a top perspective view of the preferred embodiment of the present invention illustrating an elongate body of a wiper arm proposed to receive a second form of a wiper blade assembly and a pair of wheel assemblies attached to a head portion.
Figure 26:
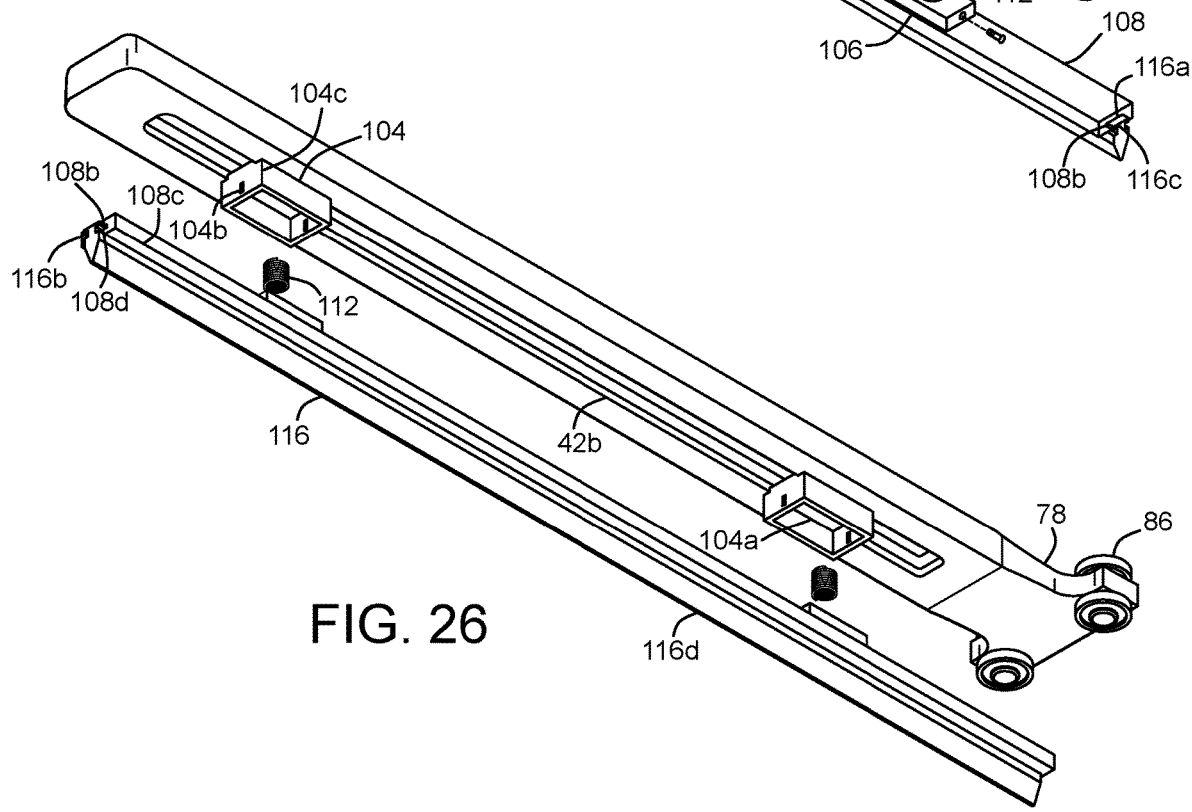
FIG. 26 is a bottom perspective view of the preferred embodiment of the present invention illustrating an elongate body of a wiper arm proposed to receive a second form of a wiper blade assembly and a pair of wheel assemblies attached to a head portion.

Alternatively, wiper attachment means, as associated with the second form of the wiper blade assembly, comprises at least one pair of receptacles 104 connecting to and extending downwardly from the bottom side 38c of the elongate body 38 and generally spanning across the opening 42, whereby each of the receptables slidably accepts therewithin a receiving block 106 integrally connecting to and extending upwardly from a top side 108a of a linear body 108. Each receiving block is shown in FIG. 25 as having a cavity 110 configured to accept and hold therewithin biasing means, preferably in the form of a spring 112. Other mechanical, spring-like devices in the form of a bent metallic plate (not shown) with resiliency characteristics, for example, may equally serve as biasing means. As generally illustrated in FIGS. 25 and 26, biasing means is configured to simultaneously engage with a top interior wall 104a of the receptacle and a bottom wall 110a of the cavity and will undergo an incremental amount of compression and expansion from time to time as the wiper arm 14 moves laterally and assumes the shape of the vehicle's window, whether it be structurally flat or curved. Securement of the receptacle with that of the receiving block is advanced by a pair of fasteners 114 that pass through an equal number of elongate apertures 104b extending through end walls 104c of the receptacle and into apertures 106a extending into the receiving block, whereby the elongate apertures aptly provide for upward and downward movement of the receiving block.

Figure 27:
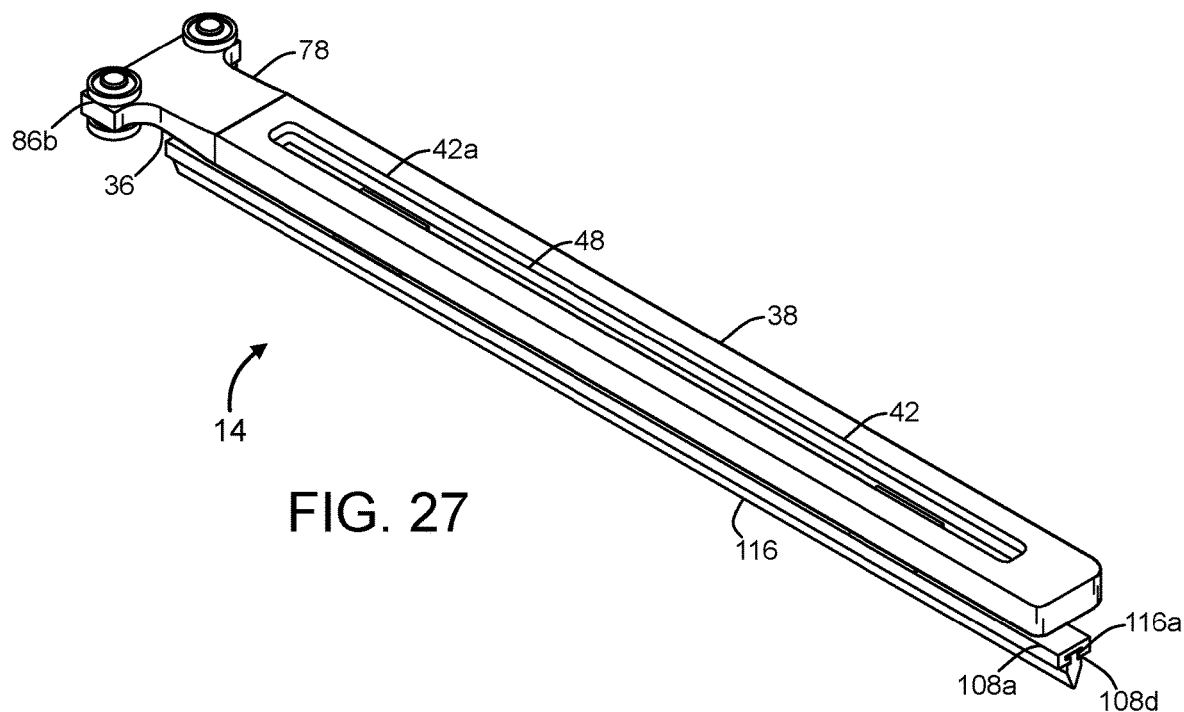
FIG. 27 is a top perspective view of the preferred embodiment of the present invention illustrating a wiper arm assembled with a second form of a wiper blade assembly and a pair of wheel assemblies attached to a widened section of a head portion.
Figure 28:
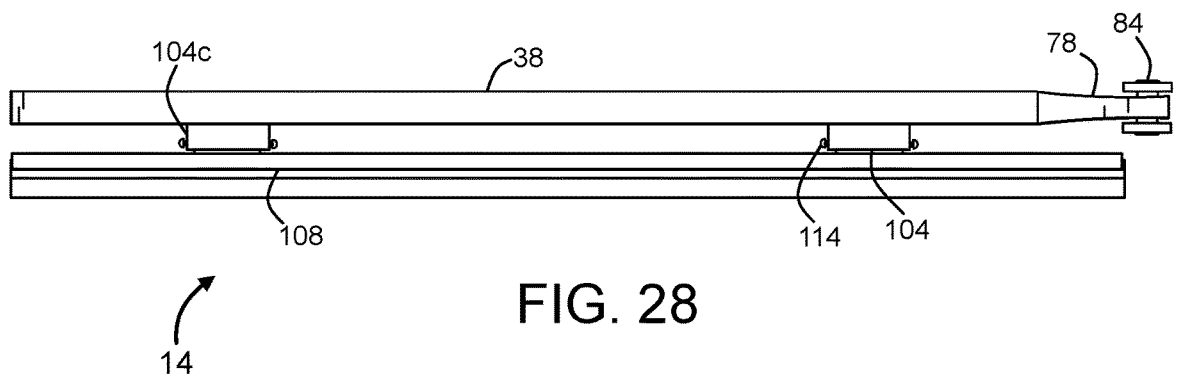
FIG. 28 is a right-side view of the preferred embodiment of the present invention illustrating a wiper arm assembled with a second form of a wiper blade assembly and a pair of wheel assemblies attached to a widened section of a head portion.

The linear body 108 of the second form of the wiper blade assembly is further shown in FIGS. 27 and 28 as comprising a lengthwise slot 108b present about a bottom surface 108c thereof for accommodating therein a top section 116a of a wiper blade 116. The top section in particular is configured with a linear groove 116b for slidably accepting therewithin edges 108d associated with the bottom surface 108c and forming the lengthwise slot and a top thickness 116c that spatially occupies the lengthwise slot so as to form a tight bond and mitigate occurrences of slippage therefrom while moving with the wiper arm 14 to effect cleaning of the window 22, mainly with a leading edge 116d of the wiper blade.

Figure 29:
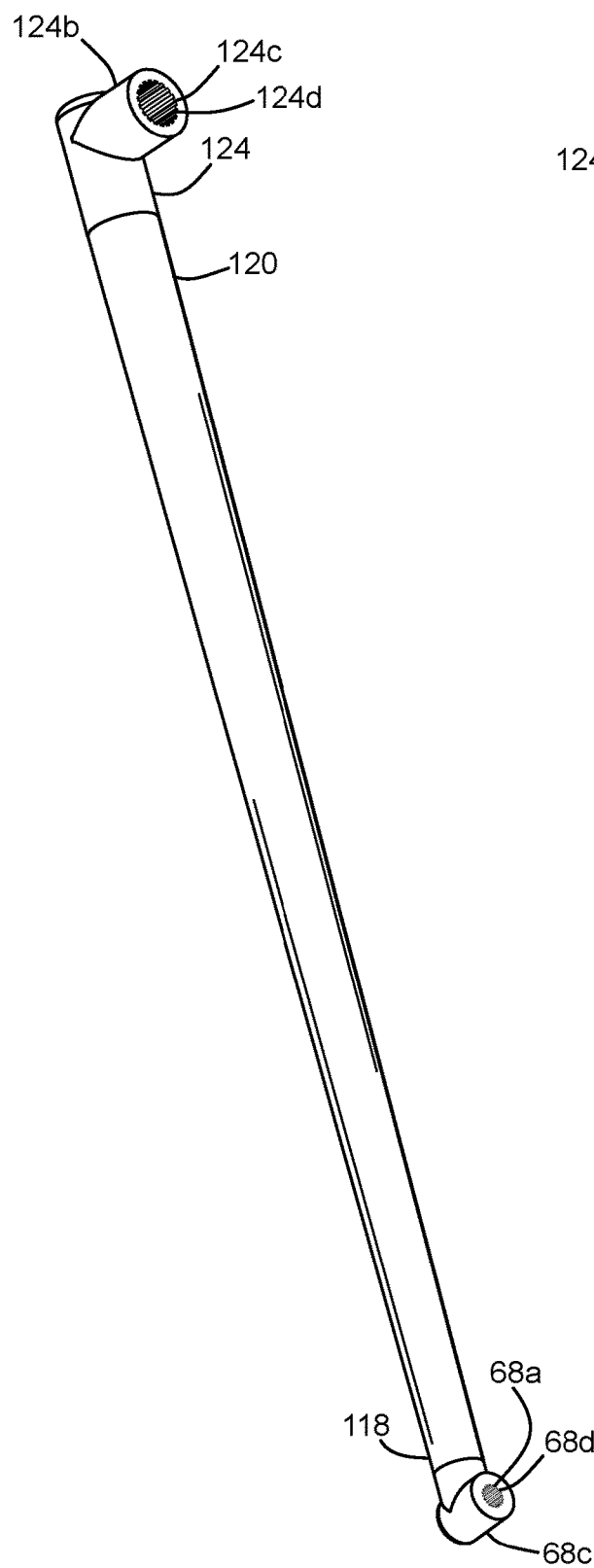
FIG. 29 is a bottom perspective view of the preferred embodiment of the present invention illustrating a pivot arm having a tapered body of a predetermined length and first and second mount fittings respectively attached to wiper arm and drive ends of the tapered body.
Figure 30:
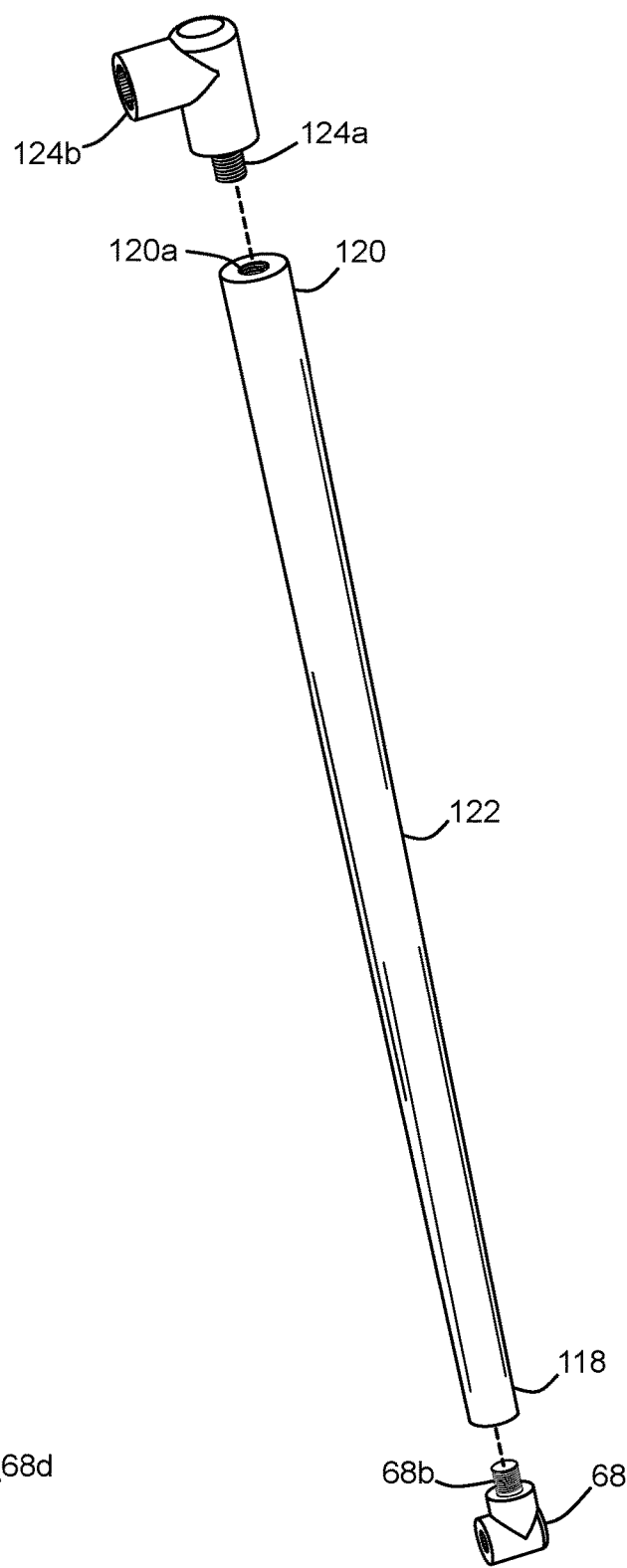
FIG. 30 is a side perspective view of the preferred embodiment of the present invention illustrating a pivot arm having a tapered body of a predetermined length and first and second mount fittings respectively separated from wiper arm and drive ends of the tapered body.
Figure 31:
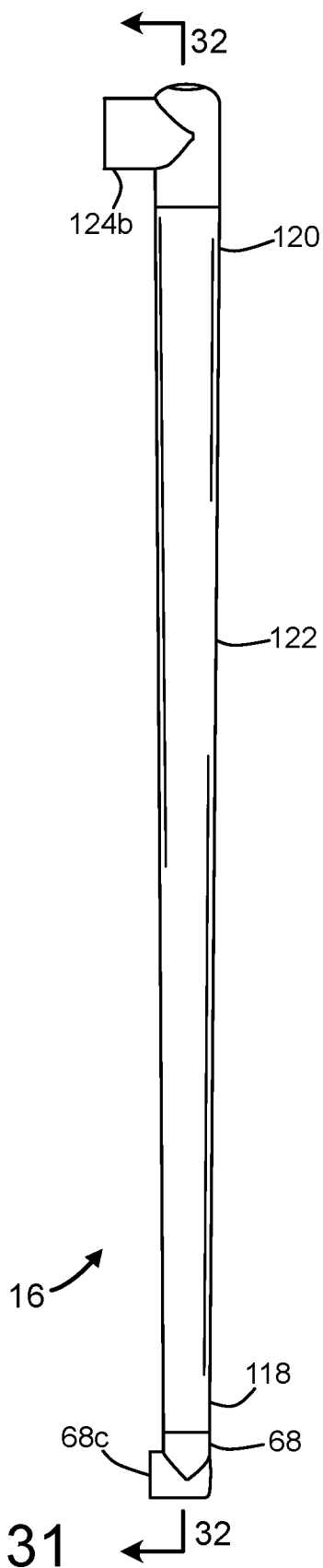
FIG. 31 is a left-side view of the preferred embodiment of the present invention illustrating a pivot arm having a tapered body of a predetermined length and first and second mount fittings respectively attached to wiper arm and drive ends of the tapered body.
Figure 32:
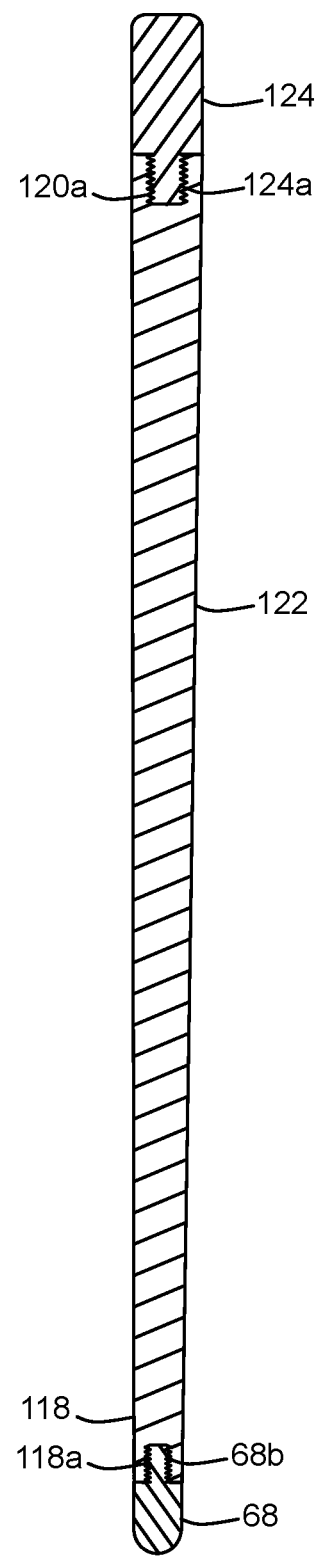
FIG. 32 is a cross sectional view of the preferred embodiment of the present invention taken along lines 32-32 in FIG. 31 illustrating a pivot arm having a tapered body with wiper arm and drive ends each being configured with a threaded bore to threadably accept threaded stems of first and second mount fittings.
Figure 33:
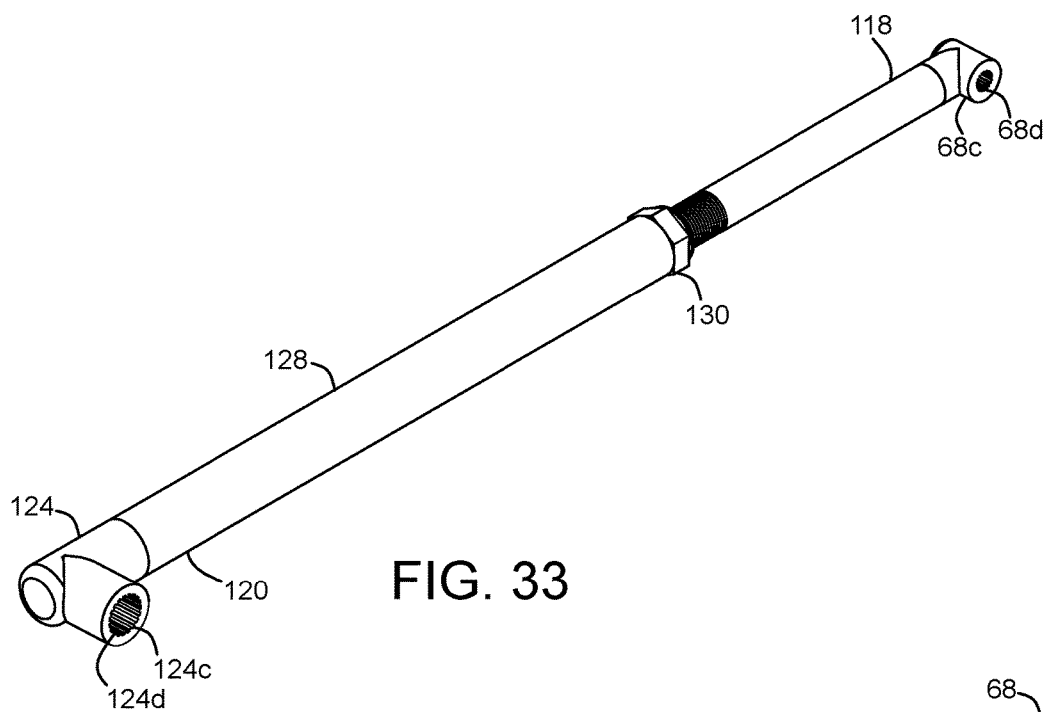
FIG. 33 is a side perspective view of the preferred embodiment of the present invention illustrating a pivot arm having a cylindrical body threadably connecting to an extension rod and first and second mount fittings.
Figure 34:
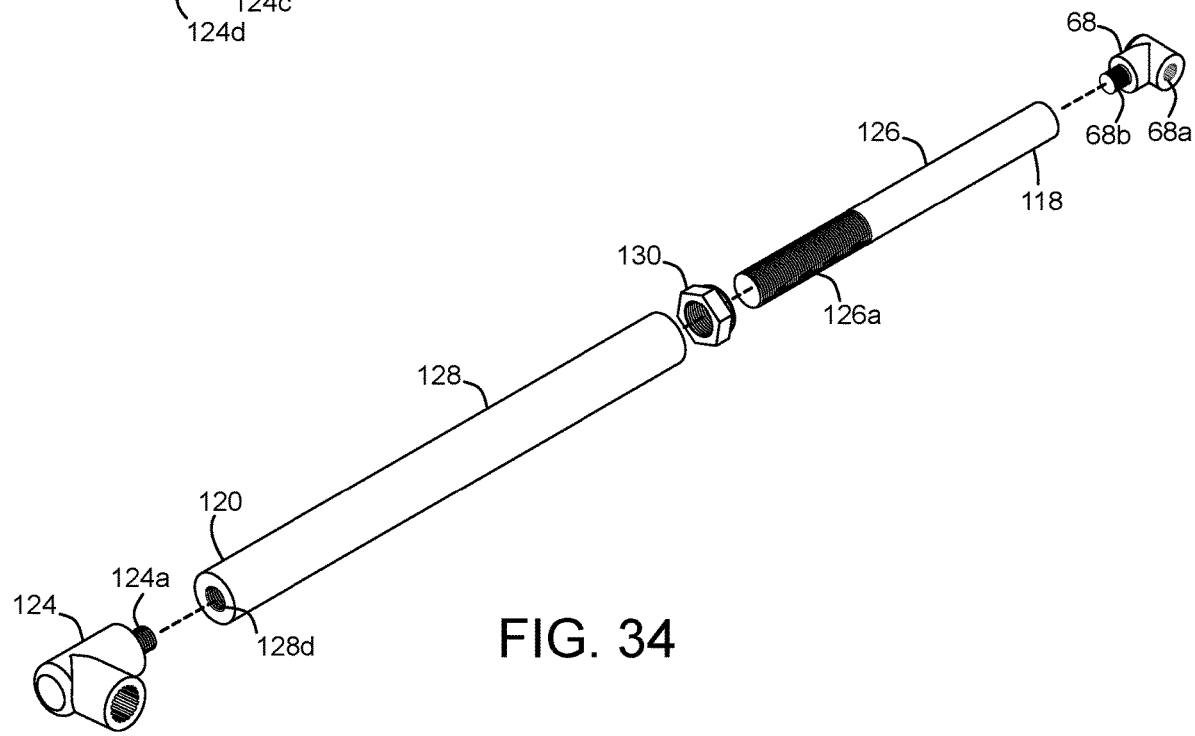
FIG. 34 is an exploded perspective view of the preferred embodiment of the present invention illustrating a pivot arm with first and second mount fittings being disassembled from a cylindrical body and an extension rod.

In FIGS. 29-40, the pivot arm 16 of the window wiper assembly 10 is generally represented by three embodiments with each thereof having a wiper arm end 118 suited to attach to the wiper arm 14 and a drive end 120 attached to the output shaft 18 of the wiper motor assembly 20 to assistively advance lateral motion of the wiper arm relatively about the entire span of the vehicle's window. As largely illustrated in FIGS. 29-32, the first embodiment of the pivot arm is shown therein as comprising a tapered body 122 of fixed length and configured with wiper arm end 118 and drive end 120 respectively attaching to the first mount fitting 68 and a second mount fitting 124. Each of the mount fittings in particular includes a threaded stem 68b, 124a for threadably engaging with an equally configured threaded bore 118a, 120a generally associated with the wiper arm and drive ends of the tapered body. Further shown in FIGS. 29 and 30, each mount fitting 68, 124 includes an opposing end 68c, 124b substantially extending perpendicular to the orientation of the threaded stem, with each of the opposing ends having a bore 68d, 124c internally featured with splines 68a, 124d, notches and other geometric configurations that lockingly mate with the adaptive end 56 of the glide post's shaft 54 as well as the output shaft 18 of the wiper motor assembly. The tapered body 122, as in FIG. 29, shows the wiper arm end 118 thereof having a reduced diameter comparatively to the drive end 120 thereof to effectively establish a reduction of weight at and near the glide post 46 that may ultimately result in a reduced amount of torsional shear stress relatively about the output shaft 18 of the wiper motor assembly 20.

Figure 35:
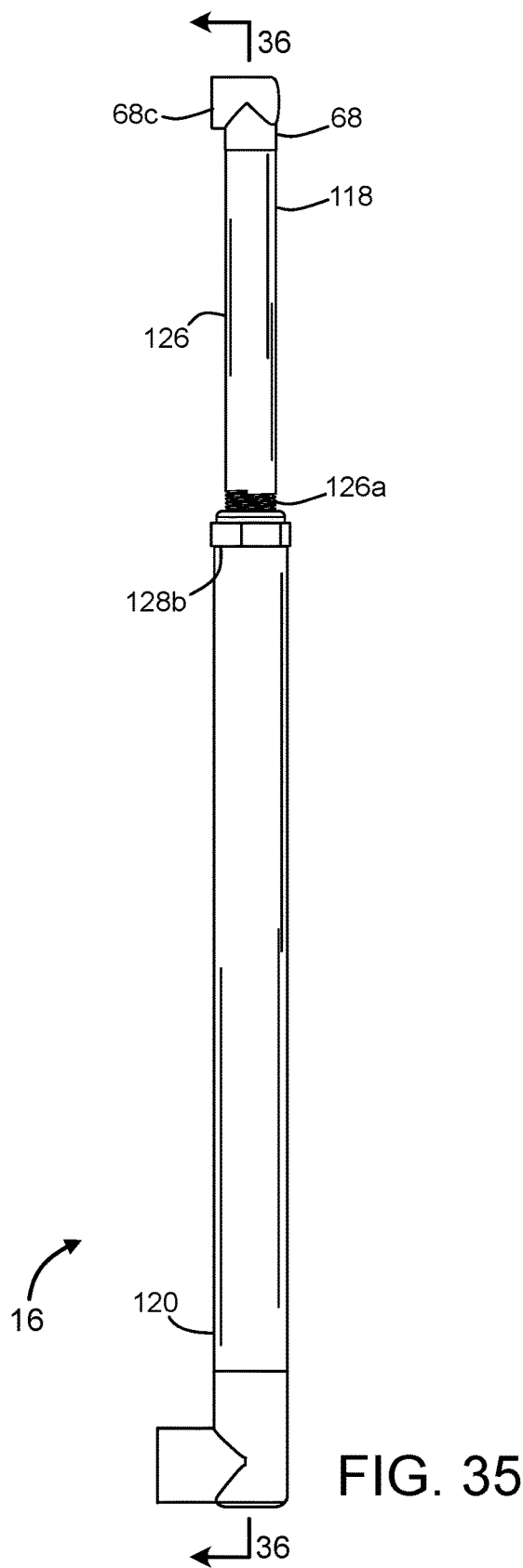
FIG. 35 is a left-side view of the preferred embodiment of the present invention illustrating a pivot arm having a cylindrical body threadably connecting to an extension rod and first and second mount fittings.
Figure 36:
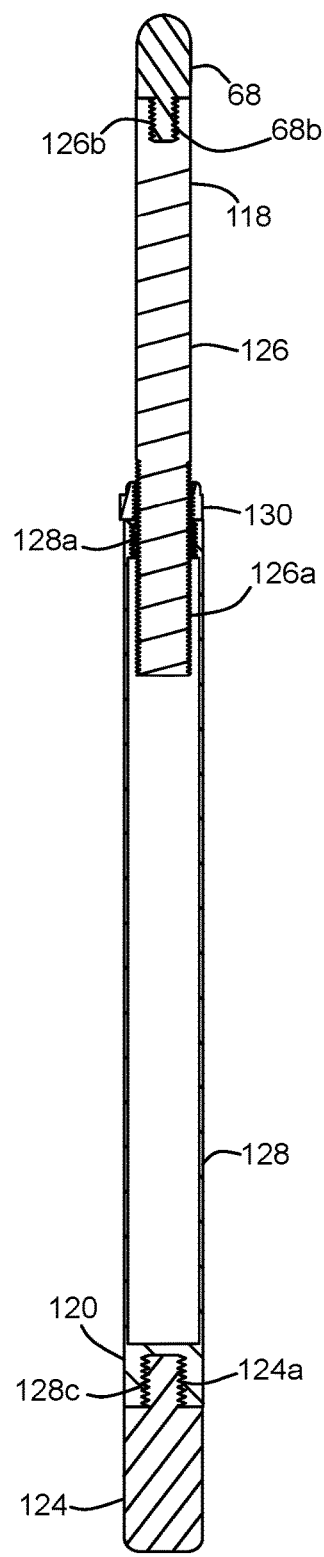
FIG. 36 is a cross sectional view of the preferred embodiment of the present invention taken along lines 36-36 in FIG. 35 illustrating a pivot arm having an extension rod threadably connecting to a cylindrical body with each respectively having threaded bores for threadably connecting first and second mount fittings.

The second embodiment of the pivot arm is particularly shown in FIGS. 33-36 as comprising means for adjustability with respect to its overall length so as to accommodate varying dimensional heights associated with the vehicle's window 22. In this regard, the second embodiment employs use of an extension rod 126 having a threaded portion 126*a* suited to threadably mate with an internal threaded bore 128*a* of a cylindrical body 128. A locking nut 130 threadably attached to the threaded portion in FIGS. 35 and 36 is threadably advanced to the extent of engaging a circumferential edge 128*b* of the cylindrical body, an assembly of which secures the position of the extension rod relative to the cylindrical body to achieve the desirable overall length of the pivot arm 16. Similar to the first embodiment of the pivot arm, the extension rod 126, as generally depicted in FIGS. 35 and 35, includes a threaded bore 126*b* at the wiper arm end 118 to threadably accept the threaded stem 68*b* of the first mount fitting 68, while the drive end 120 of the cylindrical body includes a threaded bore 128*c* to threadably accept the threaded stem 124*a* of the second mount fitting 124.

Figure 37:
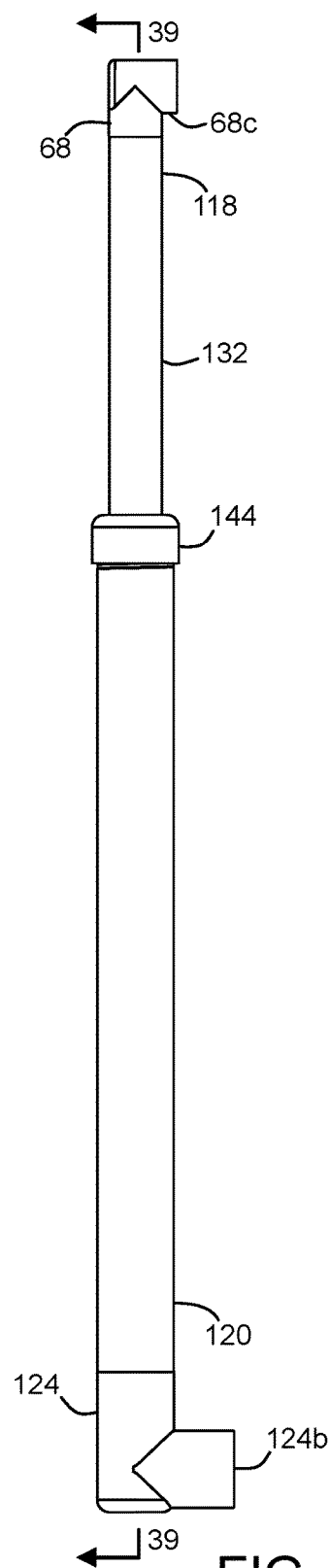
FIG. 37 is a right-side view of the preferred embodiment of the present invention illustrating a pivot arm having first and second mount fittings and a tubular body housing in part a plunger.
Figure 38:
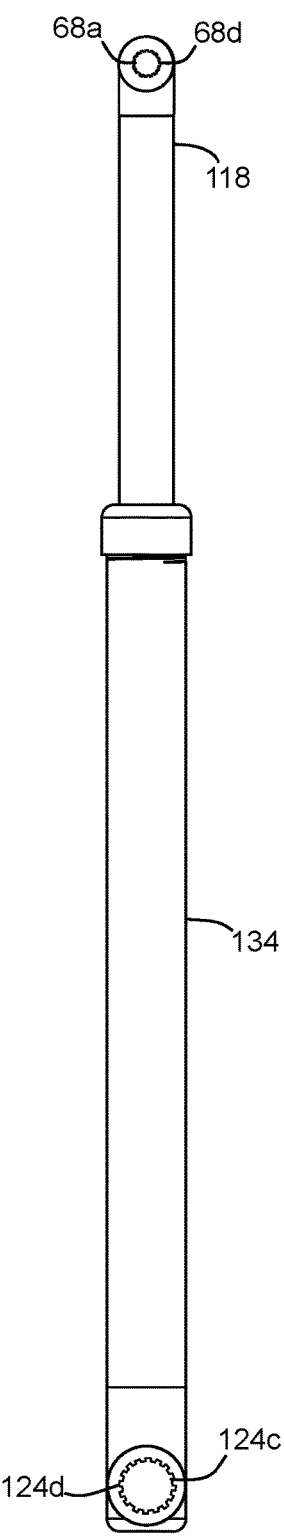
FIG. 38 is a bottom plan view of the preferred embodiment of the present invention illustrating a pivot arm having first and second mount fittings with each having a cylindrical bore and a tubular body housing in part a plunger.
Figure 39:
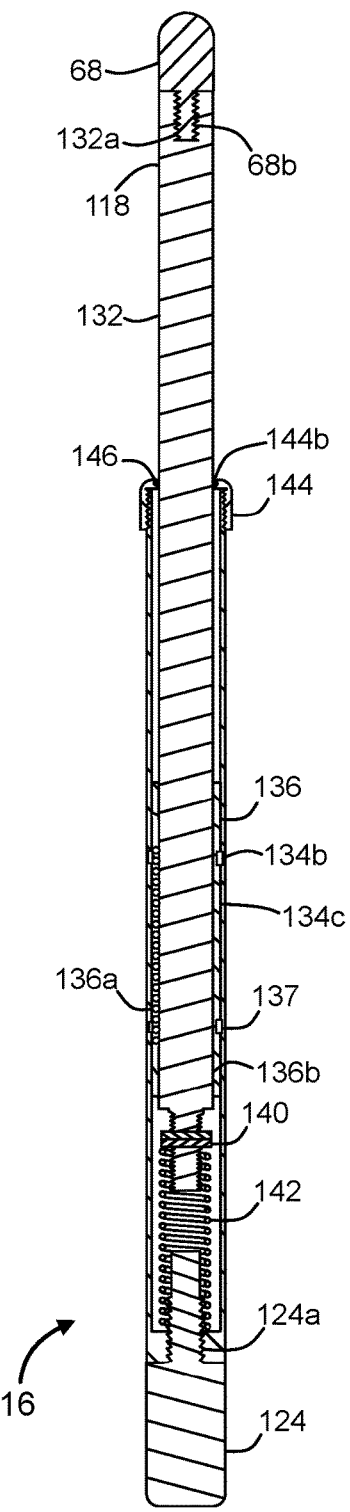
FIG. 39 is a cross sectional view of the preferred embodiment of the present invention taken along lines 39-39 in FIG. 37 illustrating a pivot arm having a tubular body housing in part a plunger, a spring mountable to an extended threaded stem, a linear bearing, and first and second mount fittings.
Figure 40:
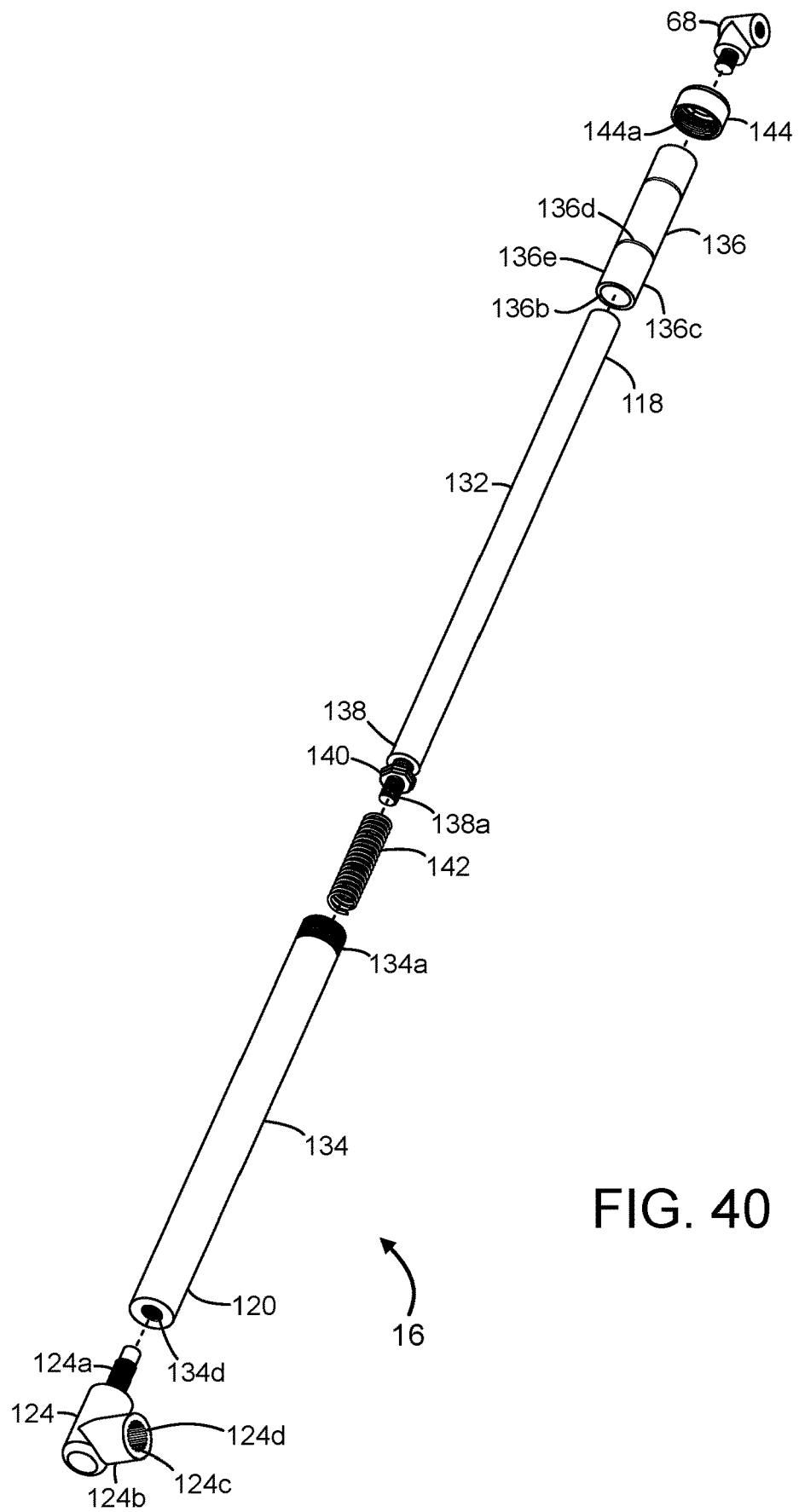
FIG. 40 is an exploded perspective view of the preferred embodiment of the present invention illustrating a pivot arm having a tubular body housing in part a plunger, a spring, a linear bearing, a cap, and first and second mount fittings.

The third embodiment of the pivot arm is generally illustrated in FIGS. 37-40 as possessing capabilities to dynamically adjust the overall length of the pivot arm 16 for certain applications that require an extended reach laterally more so than vertically, such as a vehicle window 22 having a width modestly greater than its height. In this instance, the third embodiment includes a plunger 132 that slidably fits within a tubular body 134, where a predetermined portion thereof is shown extending outwardly beyond an external threaded end 134*a* of the tubular body. A portion of the tubular body is further shown in FIGS. 39 and 40 to house a linear bearing 136 of the type conventionally configured with multiple rows of bearings 136*a* integrated within an inner lining 136*b* of a shell 136*c*, whereby the linear bearing functionally advances concentricity and sliding action of the plunger with respect to the tubular body 134. Ring clips 137 fitted within annular slots 134*b*, 136*d* respectively formed within a cylindrical wall 134*c* of the tubular body and an outer surface 136*e* of the shell appropriately secures and prevents linear movement of the linear bearing with respect to the tubular body. An internal end 138 of the plunger is depicted in FIGS. 39 and 40 as being configured with an extended threaded stem 138*a* that threadably accepts a pair of lock nuts 140 each engaging with one another to lock their relative position so as to assistively hold in place a spring 142. Movement of the lock nuts along the extended threaded stem 138*a* provide for adjustability of the spring's compression to the extent of accommodating the pivot arm's maximum and minimum reach during operation, generally being dictated by the dimensional relationship of the vehicle's window 22. Similar to the first and second embodiments of the pivot arm, the plunger 132, as generally shown in FIG. 39, includes a threaded bore 132*a* at the wiper arm end 118 suited to threadably accept the threaded stem 68*b* of the first mount fitting 68, while the drive end 120 of the tubular body 134 in FIG. 40 includes a threaded bore 134*d* to threadably accept the threaded stem 124*a* of the second mount fitting 124. However, in the case of the third embodiment of the pivot arm, the threaded stem of the second mount fitting may comprise a dimensional length greater than that associated with the first and second embodiments of the pivot arm such to allow an extended reach interiorly into the tubular body and fit within and engage the spring 142 to concentrically stabilize its position during compressive cycles. In FIGS. 37-39, a cap 144 is shown therein as being threadably engaged to the external threaded end 134*a* of the tubular body and comprising an opening 144*a* to accommodate passing of the plunger so as to assistively maintain its concentricity with regard to the tubular body 134. An O-ring seal 146 embedded within a circumferential edge 144*b* forming the opening 144*a* serves to mitigate entry of dirt, debris and like matter into the tubular body that may otherwise detrimentally compromise functionality of the linear bearing 136 and consequently the sliding action of the plunger 132.

Now by way of briefly describing the assembly and operation of the window wiper assembly 10, one may appreciably gain further insight into the relatedness and interaction of the operative components discussed thus far that principally fulfill the utilitarian objects of the present invention.

Initially, the guide rail 12 is desirably positioned two to four inches above the window 22 and fastened to the vehicle by means of the end caps 24. It is generally understood that the window configuration can vary significantly among vehicle types, such as having a more flattened surface while others having a pronounced curvature that may typically coincide with the vehicle's overall style and shape. Accordingly, it is desirable that the guide rail set forth herein be fabricated geometrically straight or include a predetermined amount of curvature to accommodate varying window configurations available in the art, such as shown in FIG. 1. Further, in some applications, a minimal amount of space may be available near the window to accommodate the guide rail, which, in this instance, the guide rail 12 may be dimensionally altered to the extent of having a higher profile, such as shown in FIGS. 41 and 42. Consequently, the head portion 36 is re-orientated to exist perpendicularly to the elongate body 38, while the circumferential surface portion 86*b* of each of the wheels 86 engages with inner sidewalls 12*g* of the guide rail. Likewise, each of the shafts 84 associated with the wheels will be perpendicularly orientated to and conventionally attached to the widen section 80 of the head portion 36.

In a preferred approach for assembly, one end cap is mounted at the desirable location, whereby the outwardly extending insert of the end cap is fitted within the internal cross-sectional profile of the guide rail 12. The head portion 36 of the wiper arm 14, as equipped with the wheel assemblies 82, is slidably placed within the interior chamber 12*d* of the guide rail, particularly in such manner where the individual wheels 86 engage with the upper interior wall 12*e* and interior leading edges 12*f* of the guide rail. Subsequently, the outwardly extending insert 26 of the second end cap 24 is slidably positioned within the opposing, second end of the guide rail with the mount flange 30 of the second end cap being fastened to the frame member 22*a* of the vehicle. The wiper arm is then prepared with the glide post 46, whereby the wheeled portion 44 of the glide post is slidably positioned within the opening 42 of the elongate body 38 of the wiper arm, which, in some instances, may require separation and re-attachment of the detachable section 70. As shown in FIGS. 21-28, the wiper arm is further prepared with either the first form or second form of the wiper blade assembly. In exemplarily case of adapting use of the first form of a wiper blade assembly 90, the mount block 94, as attaching to and extending downwardly from the elongate body 38 of the wiper arm 14, is simply inserted within the four-sided opening 96 of the conventional wiper blade 98 and affixed thereto by way of the lock pin 100, substantially as shown in FIGS. 23 and 24. Alternatively, the second form of the wiper blade assembly, as generally represented in FIGS. 25 and 26, may be prepared for use with the window wiper assembly 10 by initially placing springs 112 into the cavities 110 present within the receiving blocks 106 that attach to and extend upwardly from the top side of the linear body 108. Receptables 104 associated with the elongate body 38 aptly accept the receiving blocks, whereby fasteners 114 advance a secured relationship. Consummating the assembly includes fitment of the wiper blade 116 within the lengthwise slot 108b of the linear body. Further assembly of the window wiper assembly 10 includes removal of the existing wiper blade assembly associated with the vehicle, whereby the exposed output shaft 18 of the wiper motor assembly 20 slidably accepts the second mount fitting 124 of the pivot arm. In finalizing assembly, the first mount fitting 68 is slidably positioned to the adaptive end 56 of the glide post 46. In some instances of assembly, as it particularly concerns the third embodiment of the pivot arm 16, it may be desirable to interchange mounting of the first mount fitting to the output shaft 18 of the wiper motor assembly 20 rather than that of the shaft of the glide post 46 to re-orientate the pivot arm in an inverse or upside down orientation to mitigate water intrusion into the cylindrical body 128 that may otherwise hamper sliding movement of the plunger, notably during cold climatic conditions.

Figure 43:
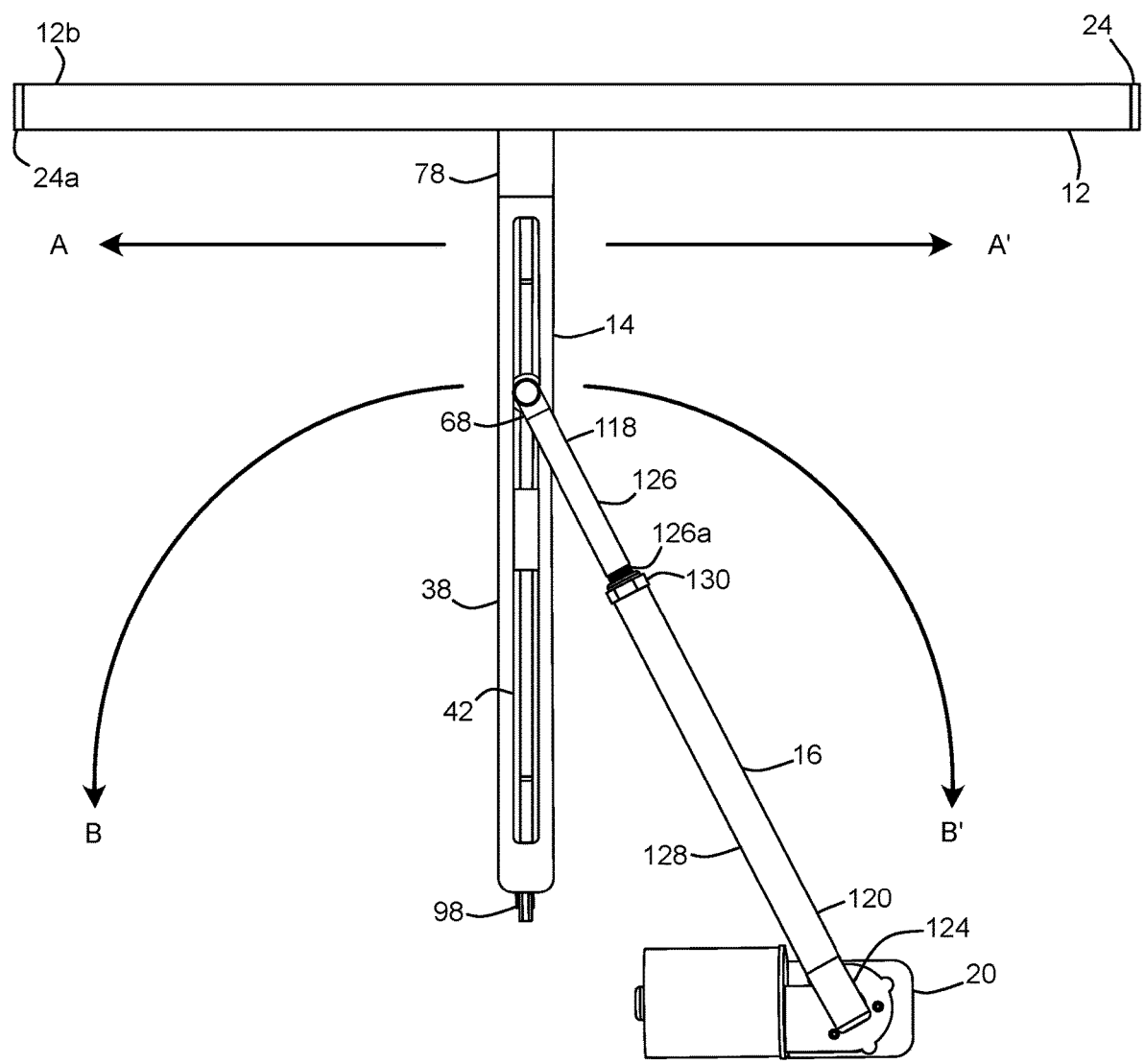
FIG. 43 is a top plan view of the preferred embodiment of the present invention illustrating a pivot arm connecting to a wiper drive motor and a wiper arm to promote movement thereof along path B-B' while the wiper arm is guided to travel relatively about a guide rail in the direction A-A'.
Figure 44:
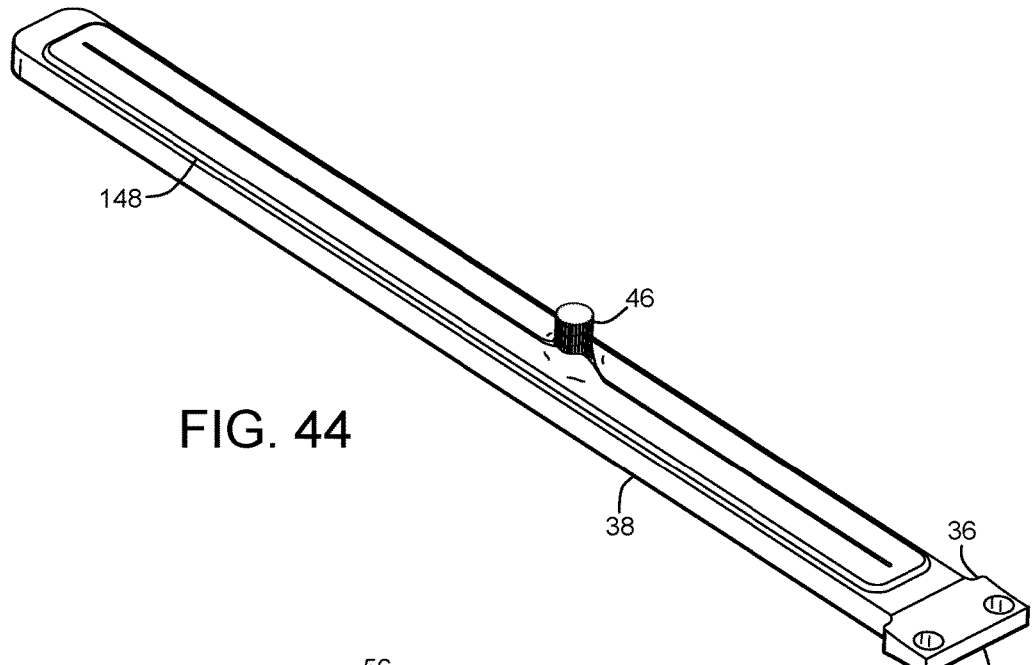
FIG. 44 is a top perspective view of the preferred embodiment of the present invention illustrating an elongate body of a wiper arm having a protective boot fitted over an opening and configured with a slit to permit passage of a shaft of a glide post.

In operation, the pivot arm 16, as connected to the wiper motor assembly 20, acts on and moves the wiper arm 14 along the length of the guide rail 12 and consequently, laterally about the window 22 in the direction A-A' in FIG. 43, whereby on or off activation and speed of the pivoting motion of the pivot arm remains under the control an integrated control system (not shown) associated with the wiper motor assembly 20 of the vehicle. The extent by which the wiper arm can move laterally is primarily dictated by the dimensional length of the pivot arm, with exception of the third embodiment of the pivot arm. In this regard, the pivot arm at its vertical or upward position in relation to the window will incrementally compress the spring as the glide post 46 engages a top end 42c of the opening 42 and will gradually release to dimensionally lengthen the pivot arm as the pivot arm rotates along path B-B' in FIG. 43 and correspondingly moves the wiper arm laterally back and forth in the direction A-A'.

It is obvious that the components comprising the window wiper assembly 10 may be fabricated from a variety of materials, providing such selection or use of materials possess the capacity to withstand forces acting thereon throughout its duration of use as well as limiting occurrences of premature failure due to repeated forces acting thereon during vehicle window cleaning operations. Accordingly, it is most desirable, and therefore preferred, to construct the window wiper assembly 10, namely, the guide rail 12, wiper arm 14, pivot arm 16 from aluminum, carbon fiber, or an equivalent type of material that meaningfully offers reasonable structural strength for its weight, while limiting the extent by which the components may unacceptably fail due to applied stresses and exposure from the elements and environmental conditions.

Figure 45:
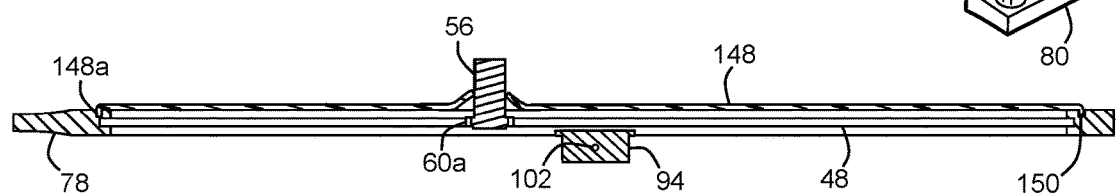
FIG. 45 is a cross sectional view of the preferred embodiment of the present invention taken along lines 45-45 in FIG. 46 illustrating an adaptive end of a glide post extending upwardly and passing through a slit of a protective boot.
Figure 46:
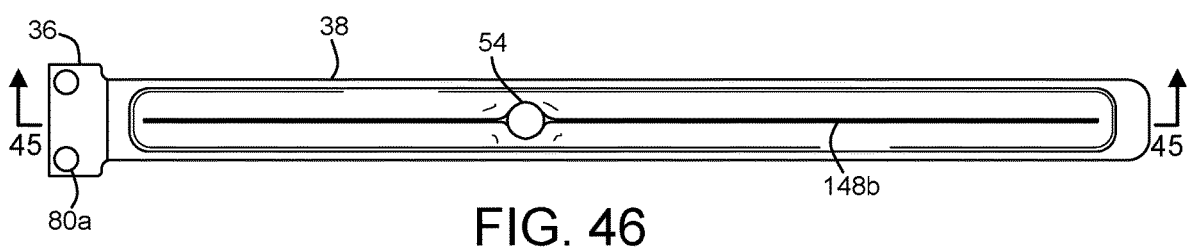
FIG. 46 is a top plan view of the preferred embodiment of the present invention illustrating an elongate body of a wiper arm and a protective boot having a slit.
Figure 47:
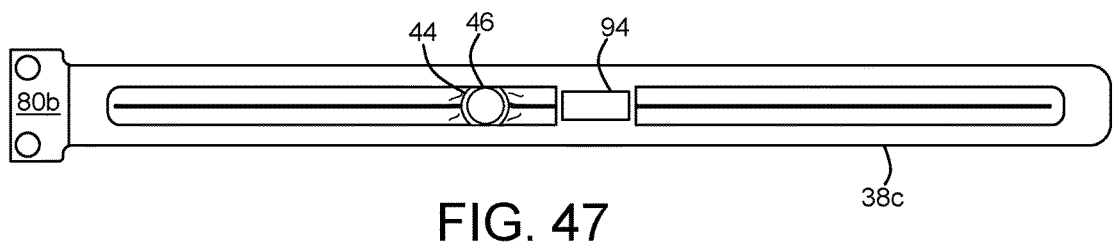
FIG. 47 is a bottom plan view of the preferred embodiment of the present invention illustrating an elongate body of a wiper arm fitted with a mount block and a protective boot having a slit.

In some application, there may be a need to mitigate occurrences of debris buildup into the interstitial areas of the integrated rail 42b of the opening 42 that may otherwise compromise smooth gliding motion and operation of the glide post relatively about the length of the opening. Accordingly, it is desirable that the elongate body 38 be fitted with a protective boot 148 of the type shown in FIGS. 44-47 that aptly covers the opening yet allows for free operation of the glide post 46. As shown in FIGS. 45 and 46, an integrated slot 150 positioned relatively about the perimeter of the opening is configured to accept a leading edge 148a of the protective boot, whereby a slit 148b sufficiently allows passage of the shaft 54 of the glide post. Compressive fitment, adhesive and the like may be used to secure the leading edge of the protective boot to the elongate body.

While there has been shown and described a particular embodiment of the invention, it will be obvious to those skilled in the art that various changes and alterations can be made therein without departing from the invention and, therefore, it is aimed in the appended claims to cover all such changes and alterations which fall within the true spirit and scope of the invention.

What is claimed is:

1. A window wiper assembly for cleaning a surface of a window, said window wiper assembly comprising, in combination:
    a guide rail having an interior chamber communicatively formed with an elongate opening and connecting to a frame member structurally supporting the window;
    a wiper arm having an elongate body integrally connecting to a head portion capable of passing into said elongate opening and slidably moving within said interior chamber of the guide rail, said elongate body having an opening extending lengthwise thereabout and configured with an integrated rail;
    a wiper blade assembly mounted to a bottom side of the elongate body;
    a glide post capable of slidably interacting with said integrated rail of the opening; and
    a pivot arm adaptably connecting said glide post to an output shaft of a wiper drive motor, whereby activation of the wiper drive motor operably sets in motion said wiper arm with that of said wiper blade assembly laterally about the surface of the window as said head portion of the elongate body traverses relatively about said interior chamber of the guide rail.

2. The window wiper assembly as set forth in claim 1, wherein said head portion of the elongate body comprises at least one pair of wheels attached thereto in an opposing manner and housed within said interior chamber of the guide rail.

3. The window wiper assembly as set forth in claim 1, further comprising a first mount fitting and a second mount fitting each having a bore, said pivot arm comprises a tapered body having a wiper arm end and a drive end respectively attaching to said first and second mount fittings.

4. The window wiper assembly as set forth in claim 3, wherein said glide post comprises a wheeled portion geometrically conforming to and slidably interacting with said integrated rail and a shaft connecting to said wheeled portion and lockingly fitting within said bore of the first mount fitting.

5. The window wiper assembly as set forth in claim 4, wherein said elongate body of the wiper arm comprises a detachable section for accommodating placement of said wheeled portion of the glide post within said opening.

6. The window wiper assembly as set forth in claim 1, wherein said pivot arm comprises an extension rod having a wiper arm end and a threaded portion and a cylindrical body having a drive end and an internal threaded bore for threadably receiving said threaded portion of the extension rod.

7. The window wiper assembly as set forth in claim 6, further comprising a first mount fitting and a second mount fitting each having a bore and respectively attaching to said wiper arm end of the extension rod and said drive end of the cylindrical body.

8. The window wiper assembly as set forth in claim 1, further comprising a first mount fitting and a second mount fitting having a threaded stem, said pivot arm comprises a plunger having a wiper arm end and an internal end configured with an extended threaded stem, a tubular body having a drive end and an external threaded end, a spring mountably positioned on said extended threaded stem and said threaded stem of the second mount fitting, said first and second mount fittings respectively attaching to said wiper arm end of the plunger and said drive end of the tubular body.

9. The window wiper assembly as set forth in claim 8, further comprising a linear bearing fitting within and connecting to said tubular body for slidably accepting therethrough and maintaining concentricity of said plunger.

10. The window wiper assembly as set forth in claim 9, further comprising a pair of lock nuts threadably attaching to said extended threaded stem for holding in position and adjusting the compression of said spring.

11. The window wiper assembly as set forth in claim 10, further comprising a cap threadably connecting to said external threaded end of the tubular body and having an opening configured with an O-ring seal for slidably accepting therethrough and maintaining concentricity of said plunger.

12. The window wiper assembly as set forth in claim 1, wherein said wiper blade assembly comprises a conventional wiper blade having a body configured with a four-sided opening and a pair of arcuate-shaped arms pivotally connecting to the body for supporting a flexible wiper blade, said elongate body having a mount block geometrically conforming to fit within the four-sided opening and being held therewithin by a lock pin.

13. The window wiper assembly as set forth in claim 1, wherein said wiper blade assembly comprises at least one pair of receptacles extending downwardly from said bottom side of the elongate body and each having a pair of elongate apertures extending through end walls of the receptacle, a linear body having a lengthwise slot and at least one pair of receiving blocks slidably fitting within said receptacles and each having a cavity, a wiper blade having a top section slidably fitting within said lengthwise slot, biasing means adaptively fitting within said cavity, and a fastener passing through each of said elongate apertures and terminating within an aperture of the receiving block for securing said receiving block to said receptacle.

14. The window wiper assembly as set forth in claim 1, further comprising a spoiler having an elongate socket for spatially accommodating therewithin said guide rail.

15. The window wiper assembly as set forth in claim 1, further comprising a pair of end caps each being mounted to an end of the guide rail and having a mount flange adaptively attaching to the frame member supporting the window.

16. The window wiper assembly as set forth in claim 1, further comprising a protective boot fitting over said opening and having a leading edge relatively attached about the periphery of said opening and a slit to accommodate passage of a shaft of the glide post.

17. A window wiper assembly for cleaning a surface of a window, said window wiper assembly comprising, in combination:
a guide rail having an interior chamber communicatively formed with an elongate opening and connecting to a frame member structurally supporting the window;
a wiper arm having an elongate body integrally connecting to a head portion capable of passing into said elongate opening and having at least one pair of wheels attached thereto in an opposing manner and housed within said interior chamber of the guide rail, said elongate body having an opening extending lengthwise thereabout and configured with an integrated rail;
a wiper blade assembly mounted to a bottom side of the elongate body;
a glide post having a shaft and a wheeled portion slidably interacting with said integrated rail of the opening; and
a pivot arm having a tapered body configured with a wiper arm end and a drive end, a first mount fitting having a bore and attached to the wiper arm end, a second mount fitting having a bore and attached to the drive end, said bores of the first and second mount fittings respectively receiving said shaft of the glide post and an output shaft of a wiper drive motor, whereby activation of the wiper drive motor operably sets in motion said wiper arm with that of said wiper blade assembly laterally about the surface of the window as said head portion of the elongate body traverses relatively about said interior chamber of the guide rail.

18. The window wiper assembly as set forth in claim 17, wherein said wiper blade assembly comprises a conventional wiper blade having a body configured with a four-sided opening and a pair of arcuate-shaped arms pivotally connecting to the body for supporting a flexible wiper blade, said elongate body having a mount block geometrically conforming to fit within the four-sided opening and being held therewithin by a lock pin.

19. The window wiper assembly as set forth in claim 17, wherein said wiper blade assembly comprises at least one pair of receptacles extending downwardly from said bottom side of the elongate body and each having a pair of elongate apertures extending through end walls of the receptacle, a linear body having a lengthwise slot and at least one pair of receiving blocks slidably fitting within said receptacles and each having a cavity, a wiper blade having a top section slidably fitting within said lengthwise slot, a spring adaptively fitting within said cavity, and a fastener passing through each of said elongate apertures and terminating within an aperture of the receiving block for securing said receiving block to said receptacle.

20. A window wiper assembly for cleaning a surface of a window, said window wiper assembly comprising, in combination:
a guide rail having an interior chamber communicatively formed with an elongate opening and connecting to a frame member structurally supporting the window;
a wiper arm having an elongate body integrally connecting to a head portion capable of passing into said elongate opening and having at least one pair of wheels attached thereto in an opposing manner and housed within said interior chamber of the guide rail, said elongate body having an opening extending lengthwise thereabout and configured with an integrated rail;
a wiper blade assembly mounted to a bottom side of the elongate body;
a glide post having a shaft and a wheeled portion slidably interacting with said integrated rail of the opening; and
a pivot arm having an extension rod configured with a wiper arm end and having a threaded portion, a cylindrical body configured with a drive end and having an internal threaded bore for threadably receiving said threaded portion of the extension rod, a first mount fitting having a bore and attaching to the wiper arm end of the extension rod, a second mount fitting having a bore and attaching to the drive end of the cylindrical body, said bores of the first and second mount fittings respectively receiving said shaft of the glide post and an output shaft of a wiper drive motor, whereby activation of the wiper drive motor operably sets in motion said wiper arm with that of said wiper blade assembly laterally about the surface of the window as said head portion of the elongate body traverses relatively about said interior chamber of the guide rail.

21. The window wiper assembly as set forth in claim 20, wherein said wiper blade assembly comprises a conventional wiper blade having a body configured with a four-sided opening and a pair of arcuate-shaped arms pivotally connecting to the body for supporting a flexible wiper blade, said elongate body having a mount block geometrically conforming to fit within the four-sided opening and being held therewithin by a lock pin.

22. The window wiper assembly as set forth in claim 20, wherein said wiper blade assembly comprises at least one pair of receptacles extending downwardly from said bottom side of the elongate body and each having a pair of elongate apertures extending through end walls of the receptacle, a linear body having a lengthwise slot and at least one pair of receiving blocks slidably fitting within said receptacles and each having a cavity, a wiper blade having a top section slidably fitting within said lengthwise slot, a spring adaptively fitting within said cavity, and a fastener passing through each of said elongate apertures and terminating within an aperture of the receiving block for securing said receiving block to said receptacle.

23. A window wiper assembly for cleaning a surface of a window, said window wiper assembly comprising, in combination:
  a guide rail having an interior chamber communicatively formed with an elongate opening and connecting to a frame member structurally supporting the window;
  a wiper arm having an elongate body integrally connecting to a head portion capable of passing into said elongate opening and having at least one pair of wheels attached thereto in an opposing manner and housed within said interior chamber of the guide rail, said elongate body having an opening extending lengthwise thereabout and configured with an integrated rail;
  a wiper blade assembly mounted to a bottom side of the elongate body;
  a glide post having a shaft and a wheeled portion slidably interacting with said integrated rail of the opening; and
  a pivot arm having a plunger configured with a wiper arm end and having an internal end configured with an extended threaded stem, a tubular body configured with a drive end and having a external threaded end, a first mount fitting having a bore and attaching to the wiper arm end of the plunger, a second mount fitting having a bore and a threaded stem threadably attaching to the drive end of the tubular body, a spring mountably positioned on said extended threaded stem and said threaded stem of the second mount fitting, said bores of the first and second mount fittings respectively receiving said shaft of the glide post and an output shaft of a wiper drive motor, whereby activation of the wiper drive motor operably sets in motion said wiper arm with that of said wiper blade assembly laterally about the surface of the window as said head portion of the elongate body traverses relatively about said interior chamber of the guide rail.

24. The window wiper assembly as set forth in claim 23, wherein said wiper blade assembly comprises a conventional wiper blade having a body configured with a four-sided opening and a pair of arcuate-shaped arms pivotally connecting to the body for supporting a flexible wiper blade, said elongate body having a mount block geometrically conforming to fit within the four-sided opening and being held therewithin by a lock pin.

25. The window wiper assembly as set forth in claim 23, wherein said wiper blade assembly comprises at least one pair of receptacles extending downwardly from said bottom side of the elongate body and each having a pair of elongate apertures extending through end walls of the receptacle, a linear body having a lengthwise slot and at least one pair of receiving blocks slidably fitting within said receptacles and each having a cavity, a wiper blade having a top section slidably fitting within said lengthwise slot, a spring adaptively fitting within said cavity, and a fastener passing through each of said elongate apertures and terminating within an aperture of the receiving block for securing said receiving block to said receptacle.

26. The window wiper assembly as set forth in claim 23, further comprising a linear bearing fitting within and connecting to said tubular body for slidably accepting therethrough and maintaining concentricity of said plunger.

27. The window wiper assembly as set forth in claim 26, further comprising a pair of lock nuts threadably attaching to said extended threaded stem for holding in position and adjusting the compression of said spring.

28. The window wiper assembly as set forth in claim 27, further comprising a cap threadably connecting to said external threaded end of the tubular body and having an opening configured with an O-ring seal for slidably accepting therethrough and maintaining concentricity of said plunger.

* * * * *